(12) United States Patent
Takahashi

(10) Patent No.: US 11,688,362 B2
(45) Date of Patent: Jun. 27, 2023

(54) DISPLAY METHOD AND DISPLAY APPARATUS

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/368,682

(22) Filed: Jul. 6, 2021

(65) Prior Publication Data

US 2022/0101812 A1    Mar. 31, 2022

(30) Foreign Application Priority Data

Sep. 29, 2020    (JP) ................................ 2020-162924

(51) Int. Cl.
   *G09G 5/10*          (2006.01)
   *G06T 3/40*          (2006.01)
   *H04N 23/63*         (2023.01)

(52) U.S. Cl.
   CPC ............. *G09G 5/10* (2013.01); *G06T 3/40* (2013.01); *H04N 23/633* (2023.01); *G09G 2320/048* (2013.01); *G09G 2360/144* (2013.01)

(58) Field of Classification Search
   CPC ............... G09G 5/10; G09G 2320/048; G09G 2360/144; G06T 3/40; H04N 5/232939
   See application file for complete search history.

(56) References Cited

U.S. PATENT DOCUMENTS

| | | | |
|---|---|---|---|
| 2008/0316349 A1* | 12/2008 | Toyoda | H04N 21/42202 |
| | | | 345/20 |
| 2015/0002694 A1 | 1/2015 | Hasegawa | |
| 2016/0028965 A1* | 1/2016 | Horii | H04N 5/225 |
| | | | 348/333.01 |

(Continued)

FOREIGN PATENT DOCUMENTS

| | | |
|---|---|---|
| JP | H11-352950 A | 12/1999 |
| JP | 2004-140736 A | 5/2004 |
| JP | 2004-294775 A | 10/2004 |

(Continued)

OTHER PUBLICATIONS

An Office Action; "Notice of Reasons for Refusal," mailed by the Japanese Patent Office dated Mar. 14, 2023, which corresponds to Japanese Patent Application No. 2020-162924 and is related to U.S. Appl. No. 17/368,682; with English language translation.

*Primary Examiner* — Adam R. Giesy
(74) *Attorney, Agent, or Firm* — Studebaker & Brackett PC

(57) ABSTRACT

Provided are a display method and a display apparatus capable of appropriately displaying a video on a display in a finder while considering user's convenience.
In an embodiment of the invention, video data is acquired by imaging under ambient light, display data based on the video data is created, and a display video corresponding to the display data is displayed on the display in the finder. Then, in a case where intensity of the ambient light is equal to or greater than a first threshold value, lightness of the display video displayed on the display in the finder is made brighter than lightness of a first standard video or in a case where the intensity of the ambient light is equal to or less than a second threshold value, the lightness of the display video displayed on the display in the finder is made darker than lightness of a second standard video.

20 Claims, 19 Drawing Sheets

(56) References Cited

U.S. PATENT DOCUMENTS

2016/0073030 A1* 3/2016 Park ................ H04N 5/232127
                                                    348/207.11
2020/0258955 A1* 8/2020 Wang ................ H01L 27/3232

FOREIGN PATENT DOCUMENTS

| JP | 2007-081619 A | 3/2007 |
| JP | 2012-039271 A | 2/2012 |
| JP | 2015-011073 A | 1/2015 |
| JP | 2018-189808 A | 11/2018 |
| JP | 2018-189859 A | 11/2018 |
| WO | 2014/175234 A1 | 10/2014 |

* cited by examiner

DISPLAY METHOD AND DISPLAY APPARATUS

CROSS-REFERENCE TO RELATED APPLICATIONS

The present application claims priority under 35 U.S.C. § 119 to Japanese Patent Application No. 2020-162924, filed on Sep. 29, 2020. The above application is hereby expressly incorporated by reference, in its entirety, into the present application.

BACKGROUND OF THE INVENTION

1. Field of the Invention

The present invention relates to a display method and a display apparatus, and in particular, to a display method that displays a video on a display in a finder and a display apparatus provided with a display inside a finder.

2. Description of the Related Art

A user who captures a video using a digital camera or the like can set and change composition (that is, an angle of view) at the time of imaging while viewing a video displayed on a display in a finder, for example. The video displayed on the display in the finder may be changed in lightness.

In JP2012-39271A, brightness of external light is detected, and in a case where the brightness of the external light is equal to or greater than a predetermined value, γ correction is executed on a signal (image signal for display) of a video displayed on the display in the finder using a gamma (γ) with an offset. According to this configuration, the visibility of the video displayed on the display in the finder is improved at the time of high brightness.

SUMMARY OF THE INVENTION

In a case of setting the lightness of the video displayed on the display, it is important to set the lightness in consideration of user's convenience, and there is a need to develop a display method and a display apparatus that realize such a configuration.

The invention has been accomplished in view of the above-described situation, and an object of the invention is to provide a display method capable of appropriately displaying a video on a display in a finder while considering user's convenience.

Another object of the invention is to provide a display apparatus for realizing the above-described display method.

To achieve the above-described object, an aspect of the invention provides a display method using a display apparatus including a sensor configured to detect intensity of ambient light and a finder provided with a display inside. The display method comprises an acquisition step of acquiring video data by imaging under the ambient light, a creation step of creating display data based on the video data, and a display step of displaying a display video corresponding to the display data on the display. In a case where the intensity of the ambient light is equal to or greater than a first threshold value, the creation step or the display step is executed under a condition that lightness of the display video displayed on the display is brighter than lightness of a first standard video or in a case where the intensity of the ambient light is equal to or less than a second threshold value, the creation step or the display step is executed under a condition that the lightness of the display video displayed on the display is darker than lightness of a second standard video.

In a case where the intensity of the ambient light is equal to or greater than the first threshold value, the creation step may be executed under a condition that the lightness of the display video displayed on the display is brighter than the lightness of the first standard video. In this case, the first standard video may be a video that is displayed on the display corresponding to display data created based on video data acquired by imaging under the ambient light with intensity less than the first threshold value.

In a case where the intensity of the ambient light is equal to or less than the second threshold value, the creation step may be executed under a condition that the lightness of the display video displayed on the display is darker than the lightness of the second standard video. In this case, the second standard video may be a video that is displayed on the display corresponding to display data created based on video data acquired by imaging under the ambient light with intensity exceeding the second threshold value.

The display video may be displayed on the display in a case where a distance between a user and the display apparatus is equal to or less than a predetermined distance.

The display data may indicate an output value with respect to an input gradation value indicated by the video data, and the input gradation value may be defined within a numerical value range including a first gradation value, a second gradation value, and a median value between the first gradation value and the second gradation value. In this case, in the creation step, first display data and second display data that are different in the output value with respect to the input gradation value closer to the first gradation value or the second gradation value than the median value may be created as the display data. In the display step, a display video corresponding to data selected based on the intensity of the ambient light between the first display data and the second display data may be displayed on the display.

In the creation step, correction corresponding to the intensity of the ambient light may be executed on an output value with respect to an input gradation value indicated by the video data to create the display data indicating a corrected output value, and a correction amount to the output value in the creation step may be changed depending on a distance between a user and the finder or lightness in the finder.

Before a usage time for which a user uses the finder reaches a set time, in the creation step, correction corresponding to the intensity of the ambient light may be executed on an output value with respect to an input gradation value indicated by the video data to create the display data indicating a corrected output value, and in the display step, the display video corresponding to the display data indicating the corrected output value may be displayed on the display. After the usage time reaches the set time, in the creation step, uncorrected display data indicating the output value on which the correction is not executed may be created, and in the display step, the display video corresponding to the uncorrected display data may be displayed on the display.

In the creation step, correction corresponding to the intensity of the ambient light may be executed on an output value with respect to an input gradation value indicated by the video data to create the display data indicating a corrected output value, and uncorrected display data indicating the output value on which the correction is not executed may be created. In this case, in the display step, the display video corresponding to the display data indicating the corrected output value and the display video corresponding to the uncorrected display data may be displayed on the display together.

The video data may indicate an input gradation value of each portion of an angle of view at the time of imaging. In a case where the intensity of the ambient light is equal to or greater than the first threshold value, the creation step may be executed under a condition that the lightness of the display video displayed on the display is brighter than the lightness of the first standard video. In a case where a first gradation portion in the angle of view where the input gradation value is equal to or less than a first reference value has a predetermined width or more, in the creation step, first gradation correction for increasing an output value with respect to the input gradation value of the first gradation portion may be executed to create the display data. In this case, a correction amount in the first gradation correction may be greater as a difference between the input gradation value of the first gradation portion and the first reference value is greater.

The video data may indicate an input gradation value of each portion of an angle of view at the time of imaging. In a case where the intensity of the ambient light is equal to or less than the second threshold value, the creation step may be executed under a condition that the lightness of the display video displayed on the display is darker than the lightness of the second standard video. In a case where a second gradation portion in the angle of view where the input gradation value is equal to or greater than a second reference value has a predetermined width or more, in the creation step, second gradation correction for decreasing an output value with respect to the input gradation value of the second gradation portion may be executed to create the display data. In this case, a correction amount in the second gradation correction may be greater as a difference between the input gradation value of the second gradation portion and the second reference value is greater.

To achieve the above-described object, another aspect of the invention provides a display apparatus comprising a processor, a sensor configured to detect intensity of ambient light, and a finder provided with a display inside. The processor is configured to acquire video data by imaging under the ambient light, create display data based on the video data, and display a display video corresponding to the display data on the display. Then, the processor is configured to make lightness of the display video displayed on the display brighter than lightness of a first standard video in a case where the intensity of the ambient light is equal to or greater than a first threshold value or the processor is configured to make the lightness of the display video displayed on the display darker than lightness of a second standard video in a case where the intensity of the ambient light is equal to or less than a second threshold value.

To achieve the above-described object, still another aspect of the invention provides a display method using a display apparatus including a finder provided with a display inside. The display method comprises an acquisition step of acquiring first video data by imaging, a creation step of creating a plurality of pieces of second video data indicating different gradation values based on the first video data, a display step of displaying a plurality of display videos corresponding to the plurality of pieces of second video data on the display, a reminder step of reminding a user of usage of the finder in a case of displaying the plurality of display videos on the display, and a storage step of storing the second video data corresponding to a display video selected by the user from among the plurality of display videos, in a storage device.

The plurality of pieces of second video data may include second video data in which correction is executed on a gradation value indicated by the first video data. In this case, in the creation step, the second video data in which first gradation correction is executed on a gradation value equal to or less than a first reference value in the first video data and the second video data in which second gradation correction is executed on a gradation value equal to or greater than a second reference value in the first video data may be created. In the display step, a display video corresponding to the second video data on which the first gradation correction is executed and a display video corresponding to the second video data on which the second gradation correction is executed may be displayed in parallel on the display.

In a case where one of the first gradation correction and the second gradation correction is first correction, and the other gradation correction is second correction, the creation step may include a first creation step and a second creation step, and the display step may include a first display step and a second display step. In the first creation step, two or more pieces of second-A video data on which a plurality of the first corrections with different correction amounts are executed may be created. In the first display step, two or more display videos corresponding to the two or more pieces of second-A video data may be displayed on the display. In the second creation step, two or more pieces of second-B video data on which the first correction executed in creating the second-A video data corresponding to the display video selected in the first display step and a plurality of the second corrections with different correction amounts are executed may be created. In the second display step, two or more display videos corresponding to the two or more pieces of second-B video data may be displayed on the display, and in the storage step, the second-B video data corresponding to the display video selected in the second display step may be stored in the storage device.

In the acquisition step, a plurality of pieces of the first video data with different exposure conditions may be acquired, and in the display step, a plurality of the display videos based on the plurality of pieces of first video data with different exposure conditions may be displayed on the display together.

In the display step, different portions where a gradation value is different between the plurality of pieces of second video data in the display videos may be displayed on the display on a magnified scale.

In the display step, the different portions designated by the user may be displayed on the display on a magnified scale.

The display video may be displayed on the display in a case where a distance between a user and the display apparatus is equal to or less than a predetermined distance.

DESCRIPTION OF THE PREFERRED EMBODIMENTS

Hereinafter, a plurality of preferred embodiments (first embodiment and second embodiment) of the invention will be described in detail referring to the accompanying drawings. Note that the embodiments described below are merely examples for ease of understanding of the invention, and are not intended to limit the invention. That is, the invention can be modified or improved from the embodiments described below without departing from the scope and spirit of the invention. The invention includes its equivalents.

First Embodiment

Figure 1:
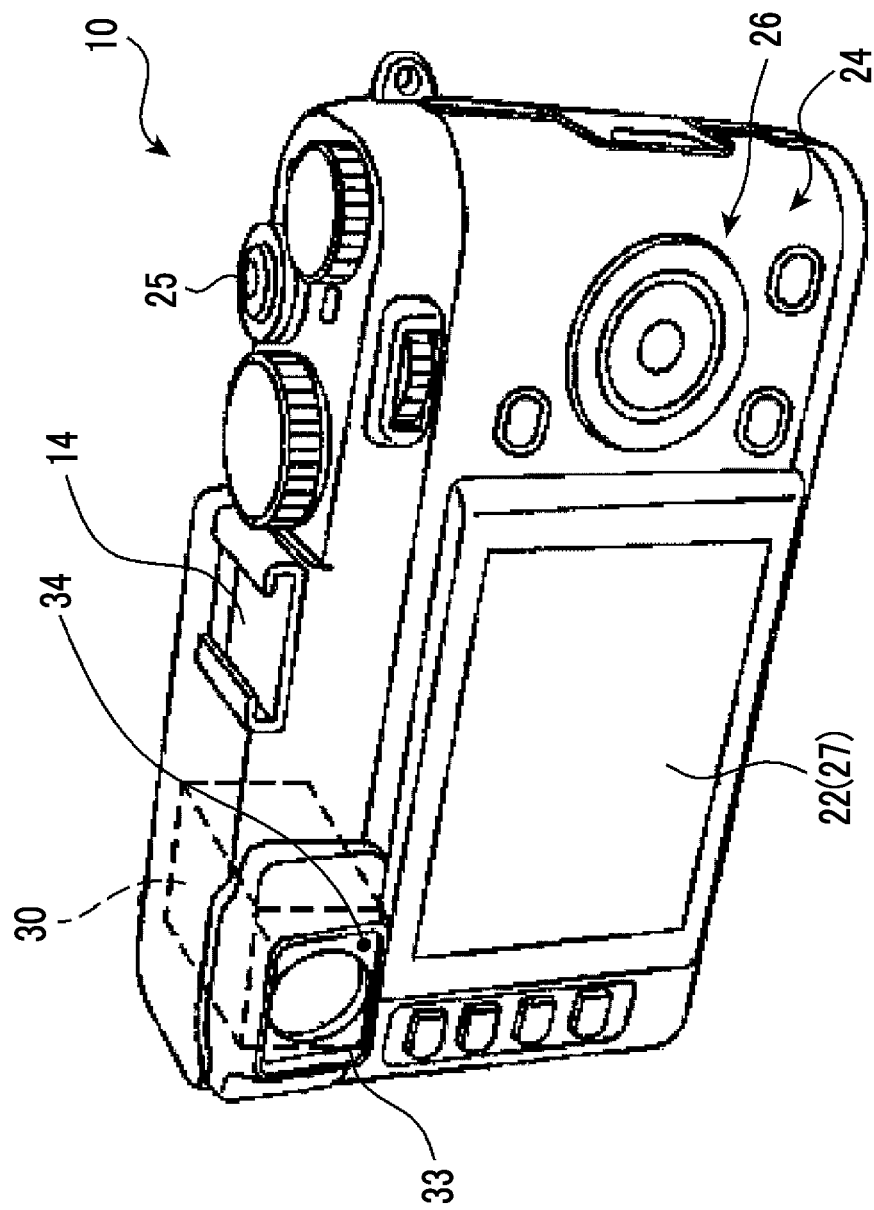
FIG. 1 is a diagram showing the appearance of a display apparatus according to an embodiment of the invention.
Figure 2:
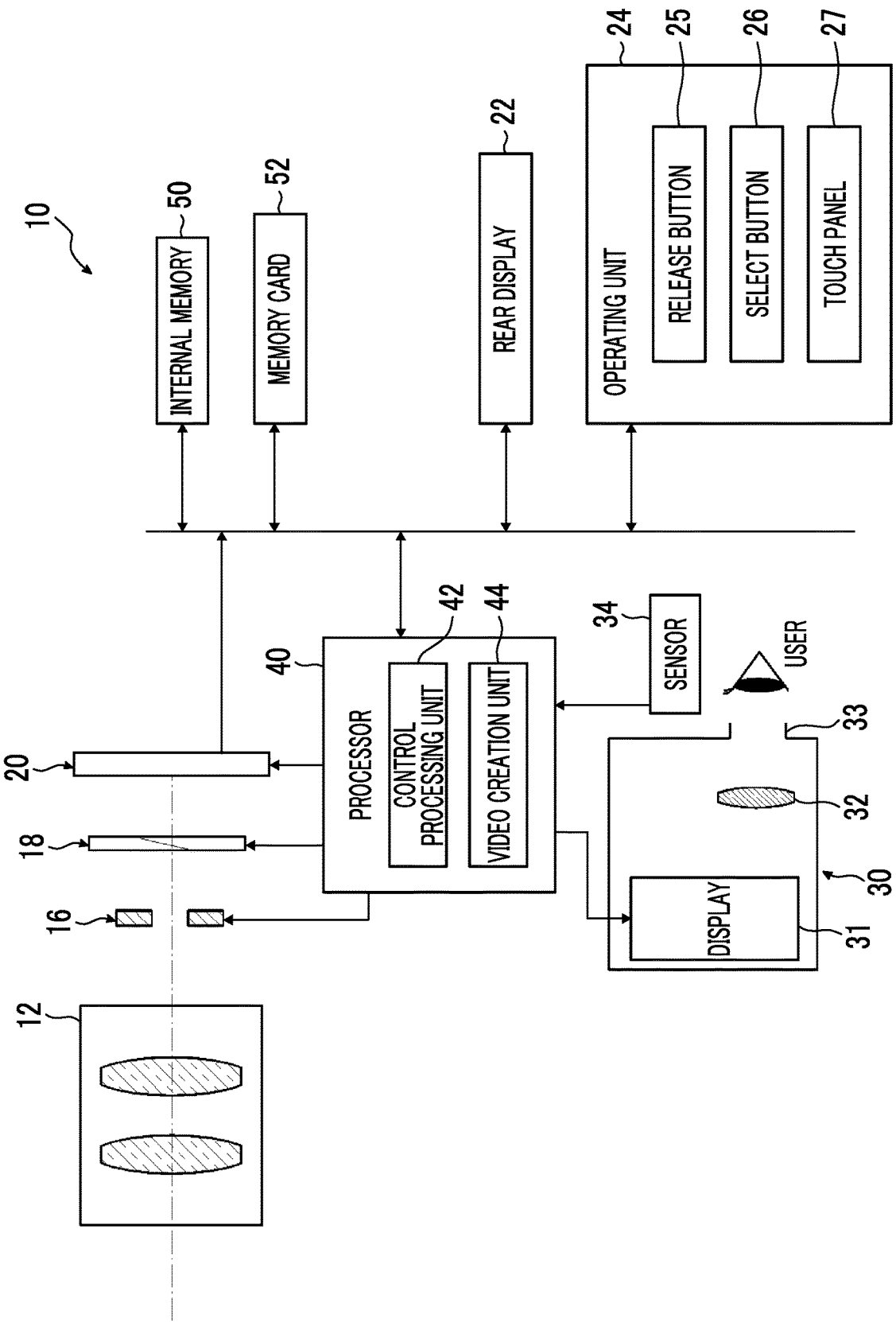
FIG. 2 is a diagram showing the configuration of the display apparatus according to the embodiment of the invention.

A first embodiment of the invention relates to a display method using a display apparatus shown in FIGS. 1 and 2.

The display apparatus according to the first embodiment is a device that displays a video of a subject during imaging, and is configured with an imaging apparatus 10, such as a digital camera. In the specification, the "video" includes a static image and a video.

Configuration of Imaging Apparatus in First Embodiment

As shown in FIGS. 1 and 2, the imaging apparatus 10 comprises an imaging lens 12, a stop 16, a shutter 18, an imaging element 20, a rear display 22, an operating unit 24, a finder 30, a processor 40, an internal memory 50, and the like.

The imaging apparatus 10 is a lens integrated type model or a lens interchangeable type model, and performs imaging at an angle of view corresponding to the imaging lens 12. During imaging, light transmitted through the imaging lens 12 is incident on the imaging element 20. The amount of light incident on the imaging element 20 is controlled by adjusting an F number of the stop 16. An exposure time at the time of imaging is controlled by adjusting a shutter speed of the shutter 18. Exposure conditions, such as the F number, the shutter speed, and ISO sensitivity, are controlled by the processor 40.

The imaging element 20 is an image sensor having color filters of three colors of Red, Green, and Blue (RGB) in the embodiment. Note that the color filters are not always necessary elements. The imaging element 20 can be configured with a charged coupled device (CCD), a complementary metal oxide semiconductor image sensor (CMOS), an organic imaging element, or the like. The imaging element 20 receives light (not limited to visible light) from the subject, converts an image of received light into a video signal as an electrical signal, and outputs the video signal.

The rear display 22 is provided on a rear surface of the imaging apparatus 10, displays a display video and various kinds of information, and displays a live view image as a display video during imaging, for example. The live view image is a real-time image of the subject during imaging.

The operating unit 24 is provided on an outer surface of the imaging apparatus 10 and receives a user's operation. As shown in FIG. 2, the operating unit 24 includes a release button 25, a cross key type or a control wheel type select button 26, a touch panel 27 provided on the rear display 22, and the like. The release button 25 is pressed in a case where the user gives an instruction to store a display video during imaging. The select button 26 and the touch panel 27 are operated, for example, in a case where the user switches a display video, selects a display video, designates a portion of a display video, or the like.

The finder 30 is a look-in type finder in which the user looks to confirm an angle of view or the like during imaging, and in detail, is an electronic view finder (EVF). The finder 30 may be a hybrid type finder that can switch between a mode of an optical view finder (OVF) and a mode of an EVF. The finder 30 may be a finder incorporated in the imaging apparatus 10 or may be an external finder that is attachably and detachably connected to a connection portion 14 (hot shoe) provided in an upper portion of the imaging apparatus 10.

As shown in FIG. 2, the finder 30 comprises a display 31, an observation optical system 32, and an eyepiece frame 33.

The display 31 is disposed inside the finder 30, and a display video is displayed on the display 31. The display 31 is configured with, for example, a liquid crystal display (LCD), a plasma display panel (PDP), an organic electroluminescence (EL) display, a light emitting diode (LED) display, or an electronic paper. The display 31 may be a display comprising a backlight. In this case, lightness of each portion of the display 31, that is, lightness of each portion in a display video can be changed by adjusting the brightness of the backlight for each pixel.

The observation optical system 32 is a lens or the like that is disposed between the display 31 and the eyepiece frame 33 to magnify a video or the like displayed on the display 31.

The eyepiece frame 33 is a frame body that surrounds a look-in window provided on the rear surface of the imaging apparatus 10. In looking in the inside (that is, the display 31) of the finder 30, the user approaches the imaging apparatus 10 and closely attaches a peripheral portion of an eye to the eyepiece frame 33. With this, the periphery of the eye of the user is surrounded by the eyepiece frame 33, and leakage of light from the outside of the imaging apparatus 10 into the finder 30 is suppressed. A leakage amount of light into the finder 30 changes depending on a distance between the user and the finder 30, that is, a degree of close attachment of a face of the user and the eyepiece frame 33.

As shown in FIG. 1, a sensor 34 is provided at a predetermined place of the eyepiece frame 33 or near the eyepiece frame 33. The sensor 34 is configured with a known illuminance sensor, a proximity sensor, or the like, detects usage of the finder 30 by the user, and specifically, outputs a signal corresponding to the distance between the user and the finder 30.

The sensor 34 can be used as a sensor that detects intensity of light (hereinafter, referred to as ambient light) in an imaging environment. The ambient light includes light in the whole imaging environment in which the imaging apparatus 10 is present, such as light emitted from the subject and light illuminating the periphery of the imaging apparatus 10.

The sensor that detects the ambient light is not limited to the sensor 34 described above, and may be, for example, an image sensor configuring the imaging element 20. That is, the intensity of the ambient light may be detected from an exposure amount detected by the image sensor, and specifically, an integrated value of an exposure amount calculated for automatic exposure control (AE control) or auto white balance control (AWB control).

Though not shown in FIGS. 1 and 2, the finder 30 may further comprise a light-measuring sensor that measures lightness (intensity of light) inside the finder 30 or a distance-measuring sensor that measures the distance between the user and the finder 30.

The processor 40 is configured to control each unit of the imaging apparatus 10 and execute various kinds of processing including imaging, storage of a video, and display of a video. The processor 40 may be configured with one or a plurality of pieces of hardware equipment, for example, a central processing unit (CPU), a field programmable gate array (FPGA), a digital signal processor (DSP), an application specific integrated circuit (ASIC), a graphics processing unit (GPU), a micro-processing unit (MPU), or other integrated circuits (ICs). Alternatively, the processor 40 may be configured by combining such ICs. The processor 40 may configure all functions of the processor 40 with one integrated circuit (IC) chip, as represented by system on chip (SoC). The hardware configuration of the processor 40 described above may be realized by an electric circuit (circuitry), in which circuit elements, such as semiconductor elements, are combined.

The internal memory 50 is an example of a storage device, and a program that is executed by the processor 40 is stored in the internal memory 50. As the program is executed by the processor 40, as shown in FIG. 2, the processor 40 functions as a control processing unit 42 and a video creation unit 44.

A display data creation circuit 47 may be provided inside a module of the rear display 22 or the display 31. The display data creation circuit 47 may be provided both inside and outside (inside a housing of the imaging apparatus 10) the module described above.

The program that is executed by the processor 40 is not always stored in the internal memory 50, and may be stored in a memory card 52 that is an example of a storage device. The memory card 52 is inserted into a card throttle (not shown) provided in the imaging apparatus 10 and used.

The control processing unit 42 is configured to control each unit of the imaging apparatus 10 in response to a user's operation through the operating unit 24 or conforming to a predetermined control rule. For example, the control processing unit 42 performs control such that the stop 16, the shutter 18, and the imaging element 20 automatically change exposure conditions corresponding to the intensity of the ambient light. In a case where the release button 25 is pressed, the control processing unit 42 stores data (video data) of a video captured at that time in the storage device, such as the internal memory 50 or the memory card 52.

The control processing unit 42 is configured to display a display video on the rear display 22 or the display 31 during imaging. In the first embodiment, the control processing unit 42 displays, based on display data created by the video creation unit 44, a display video corresponding to the display data. In this case, the control processing unit 42 decides any of the rear display 22 and the display 31 on which the display video is displayed. For example, in a case where the sensor 34 described above detects that a distance between the user and the imaging apparatus 10 is equal to or less than a predetermined distance (in detail, the face of the user is at a position in contact with the eyepiece frame 33), the control processing unit 42 displays the display video on the display 31.

Figure 3:
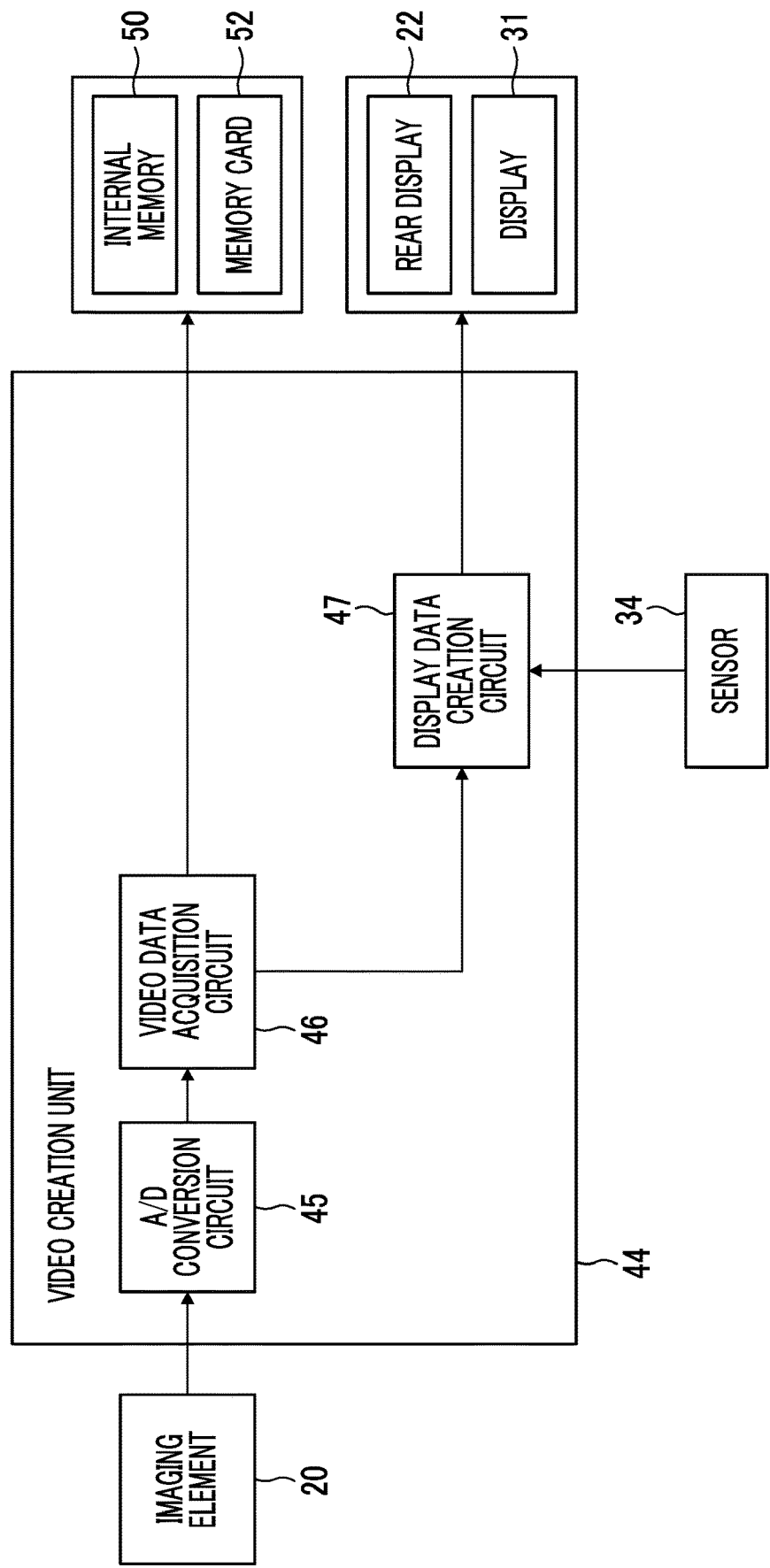
FIG. 3 is a diagram showing the configuration of a video creation unit according to a first embodiment.

The video creation unit 44 is configured to acquire video data by imaging under the ambient light, and in the first embodiment, create display data from the acquired video data. As shown in FIG. 3, the video creation unit 44 according to the first embodiment has an analog/digital (A/D) conversion circuit 45, a video data acquisition circuit 46, and a display data creation circuit 47.

The A/D conversion circuit 45 converts the video signal output from the imaging element 20 from the analog signal into a digital signal. The video data acquisition circuit 46 executes image processing, such as γ correction and white balance correction, on the converted digital signal, and compresses a processed signal in a predetermined standard to acquire video data. The video data is data indicating a gradation value of each portion of the angle of view at the time of imaging, and in detail, gradation values of three colors of RGB for each pixel. In the first embodiment, the gradation value indicated by the video data is referred to as an "input gradation value". The input gradation value is defined within a numerical value range including a lower limit value as a first gradation value, an upper limit value as a second gradation value, and a median value positioned between the lower limit value and the upper limit value, and is defined in a numerical value range of 0 to 255, for example, in a case where the video data is data in an eight-bit format.

The display data creation circuit 47 creates display data based on the video data, and in detail, executes correction on an output value with respect to the input gradation value indicated by the video data to create display data. The display data is data indicating the output value for each pixel. Hereinafter, unless otherwise specifically described, the output value indicated by the display data is a gradation value (output gradation value) that is defined within the same numerical value range as the input gradation value.

In the first embodiment, the correction that is executed by the display data creation circuit 47 to create the display data is correction different from normal γ correction, and is correction depending on the intensity of the ambient light. Hereinafter, the correction corresponding to the intensity of the ambient light that is executed by the display data creation circuit 47 is simply referred to as "correction".

The correction is processing of changing the output value with respect to the input gradation value from a value in a case where normal γ correction is executed, and includes first gradation correction and second gradation correction. The display data creation circuit 47 executes the correction on the output value to create display data indicating a corrected output value.

In the first embodiment, as described above, in a case where the distance between the user and the imaging apparatus 10 is equal to or less than the predetermined distance, the display video corresponding to the display data is displayed on the display 31. The lightness of the display video displayed on the display 31 in this case is lightness corresponding to the output value indicated by the display data. The lightness is the physical brightness in each portion of the display video and is decided depending on the output value. The display video is brighter as the output value is greater.

Video Display Flow in First Embodiment

Next, a video display flow in the first embodiment will be described. The video display flow is executed while the user performs imaging using the imaging apparatus 10. In the video display flow in the first embodiment, a video (live view image) of the subject being imaged can be displayed as a display video on the display 31 by a display method according to the first embodiment of the invention.

Figure 4:
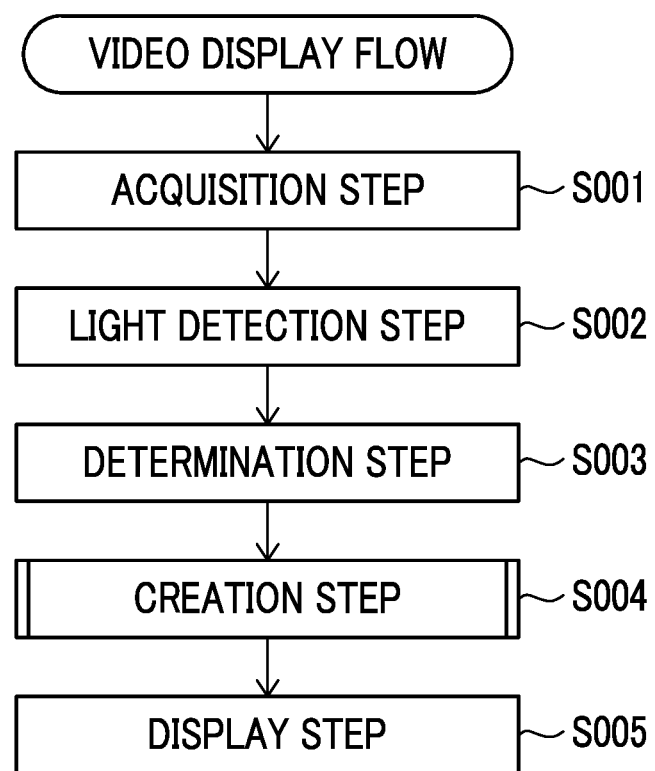
FIG. 4 is a diagram showing a video display flow in the first embodiment.

As shown in FIG. 4, the video display flow in the first embodiment includes an acquisition step S001, a light detection step S002, a determination step S003, a creation step S004, and a display step S005. The steps are executed in order by the processor 40.

In the acquisition step S001, video data is acquired by imaging under ambient light. In detail, the video creation unit 44 acquires video data based on a video signal output from the imaging element 20 as needed during imaging.

In the light detection step S002, the intensity of the ambient light is detected by the sensor 34, the image sensor configuring the imaging element 20, or the like (hereinafter, referred to as a sensor for light detection) during imaging.

In the determination step S003, determination is made regarding a magnitude relationship between the intensity of the ambient light detected by the sensor for light detection and two threshold values (first threshold value and second threshold value). Specifically, determination is made whether or not the intensity of the ambient light is equal to or greater than the first threshold value or whether or not the intensity of the ambient light is equal to or less than the second threshold value. Each of the first threshold value and the second threshold value is a value as a determination criterion for executing the correction in the creation step S004, and is decided depending on the lightness of the display 31. The lightness of the display 31 is lightness (specifically, rated output) determined as the equipment specification of the display 31 or lightness set in advance by the user as a usage condition of the display 31.

The first threshold value is, for example, a value corresponding to lightness exceeding the lightness of the display 31, and the second threshold value is, for example, a value corresponding to lightness sufficiently lower than the lightness of the display 31.

In the creation step S004, display data is created based on the video data.

In the display step S005, a display video corresponding to the created display data is displayed on the display 31. In the first embodiment, in a case where the distance between the user and the imaging apparatus 10 is equal to or less than the predetermined distance, the display step S005 is executed, and the display video is displayed on the display 31. With this, it is possible to display a video on the display 31 efficiently depending on the distance between the user and the imaging apparatus 10.

A series of Steps S001 to S005 described above are repeatedly executed during imaging. Then, in a case where the user presses the release button 25 during the execution of the display step S005, video data indicating a video at that time is stored in the storage device, such as the internal memory 50 or the memory card 52, by the control processing unit 42.

A procedure of the creation step S004 will be described in detail referring to FIG. 5.

Figure 5:
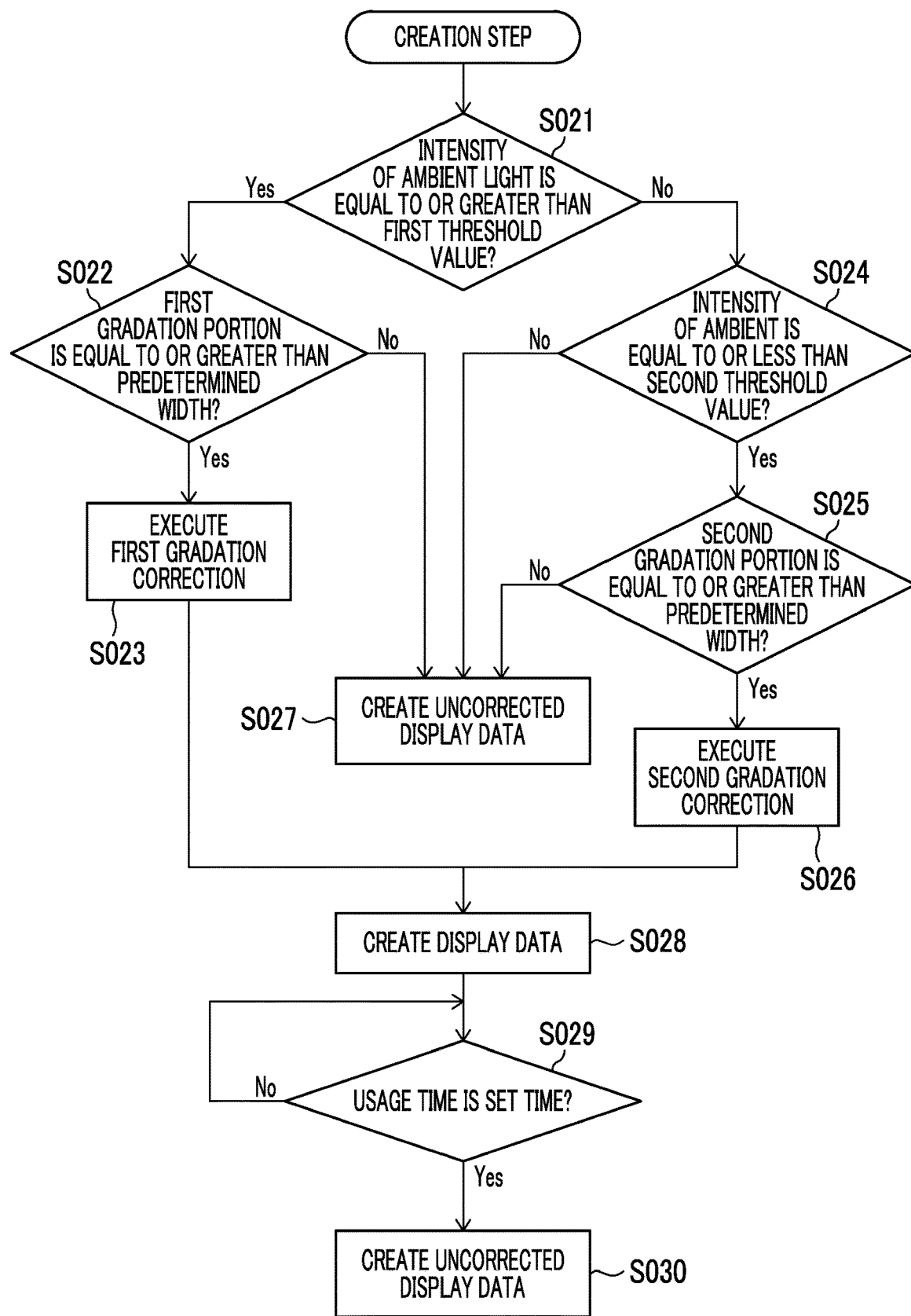
FIG. 5 is a diagram showing a procedure of a creation step in the first embodiment.

In the creation step S004, as shown in FIG. 5, an output value with respect to an input gradation value indicated by the video data acquired in S001 is decided.

Figure 6:
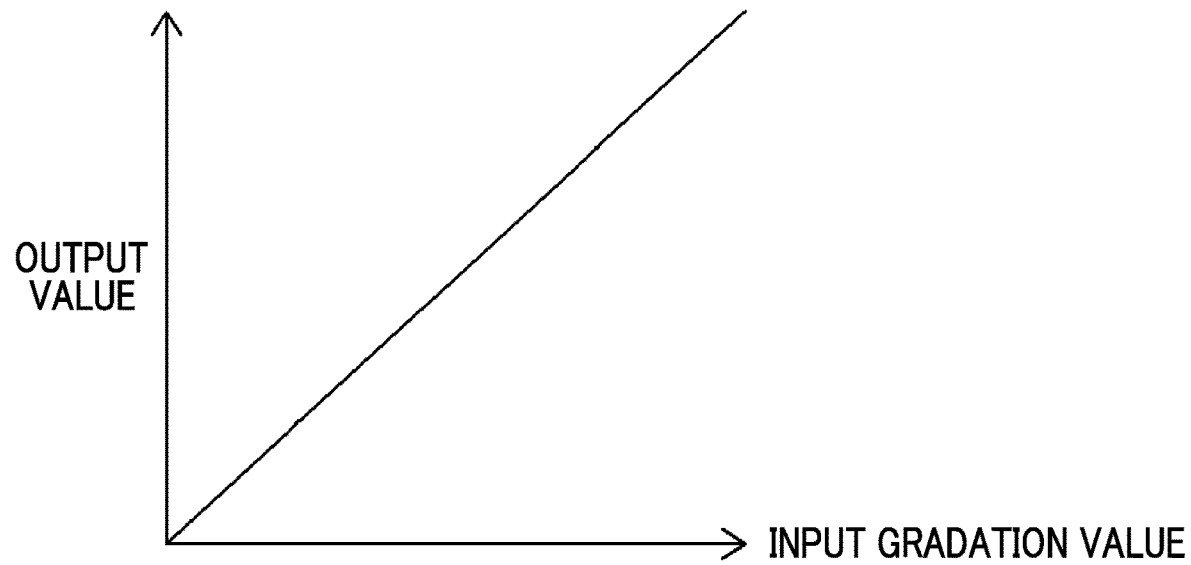
FIG. 6 is a diagram showing a correspondence relationship between an input gradation value and an output value in γ correction.

In a case where the intensity of the ambient light is within a normal range, a value obtained by executing γ correction on the input gradation value is the output value. In the first embodiment, γ correction is executed such that the input gradation value and the output value have a linear relationship shown in FIG. 6.

In the first embodiment, correction is executed on the output value depending on a magnitude relationship between the intensity of the ambient light and the threshold values, and display data corresponding to the intensity of the ambient light is created. Specifically, in a case where the intensity of the ambient light is equal to or greater than the first threshold value (S021), the display data is created (the creation step is executed) under a condition that lightness of a display video displayed on the display 31 is brighter than lightness of a first standard video. In a case where the intensity of the ambient light is equal to or less than the second threshold value (S024), the display data is created (the creation step is executed) under a condition that the lightness of the display video displayed on the display 31 is darker than lightness of a second standard video.

Here, the first standard video and the second standard video are display videos based on video data acquired by imaging under the ambient light with intensity exceeding the second threshold value and intensity less than the first threshold value, respectively. That is, the first standard video and the second standard video are videos based on video data acquired in a case where the intensity of the ambient light is within the normal range, and in detail, are videos that are displayed on the display 31 corresponding to display data created based on the video data. The first standard video and the second standard video may be videos with identical lightness or may be videos with different lightness.

In a case where the intensity of the ambient light is equal to or greater than the first threshold value or is equal to or less than the second threshold value, the correction is executed in the creation step S004 (S023, S026), and display data indicating a corrected output value is created (S028).

On the other hand, in a case where the intensity of the ambient light exceeds the second threshold value and is less than the first threshold value, uncorrected display data indicating an output value on which the correction is not executed (that is, the output value on which only the γ correction is executed) is created (S027). A video displayed on the display 31 corresponding to the uncorrected display data created in Step S027 can be used as the first standard video and the second standard video described above.

In the first embodiment, the correction is correction on the display video displayed on the display 31, and is not correction on the video data in the acquisition step S001. Accordingly, the correction in the first embodiment is not reflected in the video data stored in the storage device, such as the memory card 52 or the internal memory 50.

Figure 7:
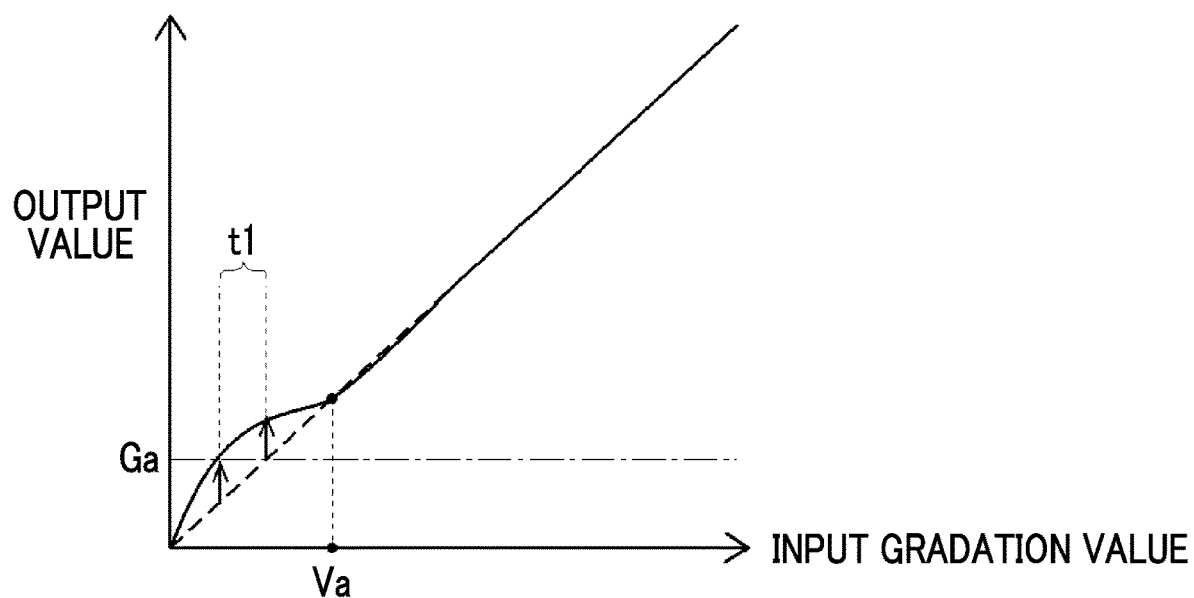
FIG. 7 is a diagram showing an example of first gradation correction.

The correction in the first embodiment includes first gradation correction and second gradation correction. The first gradation correction is executed in a case where the intensity of the ambient light is equal to or greater than the first threshold value, and as shown in FIG. 7, is correction for increasing an output value with respect to an input gradation value of a first gradation portion more than a γ corrected output value. The first gradation portion is a portion in the angle of view at the time of imaging where the input gradation value is equal to or less than a first reference value, that is, a low gradation portion (dark portion). The first reference value (a value Va in FIG. 7) is set to a numerical value corresponding to ⅓ to ¼ of a median value in a numerical value range (for example, 0 to 255) defining the input gradation value.

With the first gradation correction, the output value of the first gradation portion is corrected from a value on a broken line to a value on a solid line in FIG. 7, and is a gradation value higher than the value after the γ-correction. That is, the lightness of the first gradation portion after the first gradation correction is executed appears brighter than the lightness of the display video in a case where the correction is not executed, that is, the first standard video.

With the first gradation correction, for example, in a case where the user looks in the finder 30 during imaging under bright ambient light, the user can more easily view the first gradation portion while the eye of the user is adapted to darkness. That is, in the display video displayed on the display 31, a portion that is hardly viewed since the γ corrected output value falls below a given value (a value Ga in FIG. 7), specifically, a portion indicated by a symbol t1 in FIG. 7 is easily viewed by the first gradation correction. The effect is particularly effective in a case where the first gradation portion in the display video is hardly viewed since external light is strong, such as backlighting.

In the first embodiment, in a case where the intensity of the ambient light is equal to or greater than the first threshold value, determination is made whether or not the first gradation portion in the angle of view has a predetermined width or more, and specifically, whether or not the number of pixels configuring the first gradation portion is equal to or greater than a predetermined number (S022).

Then, in a case where the first gradation portion has the predetermined width or more, the first gradation correction is executed, and the display data indicating the corrected output value is created. With this, in a case where the effect of the correction is effectively exhibited, the first gradation correction can be executed, and on the contrary, in a case where the first gradation portion is too small and the effect of the correction is not sufficiently obtained, the execution of the first gradation correction can be omitted.

From a viewpoint of improving the visibility of the user, it is desirable that, as shown in FIG. 7, a correction amount in the first gradation correction is set to be greater as a difference between the input gradation value of the first gradation portion and the first reference value Va is greater. That is, as the input gradation value of the first gradation portion is lower, the correction amount in correcting the output value with respect to the input gradation value is preferably set to be greater.

In a case where the correction amount is made large, a region in the first gradation portion where the input gradation value is near the lower limit value appears bright in a video displayed on the display 31 regardless of a region appearing dark in an actual video. As a result, a difference of brightness and darkness (contrast) in the display video deviates from the actual video. For this reason, in consideration of a balance between the display video and the actual video, as shown in FIG. 7, in the region where the input gradation value is near the lower limit value, the correction amount of the first gradation correction is preferably set to be gradually smaller as the input gradation value is lower.

Figure 8:
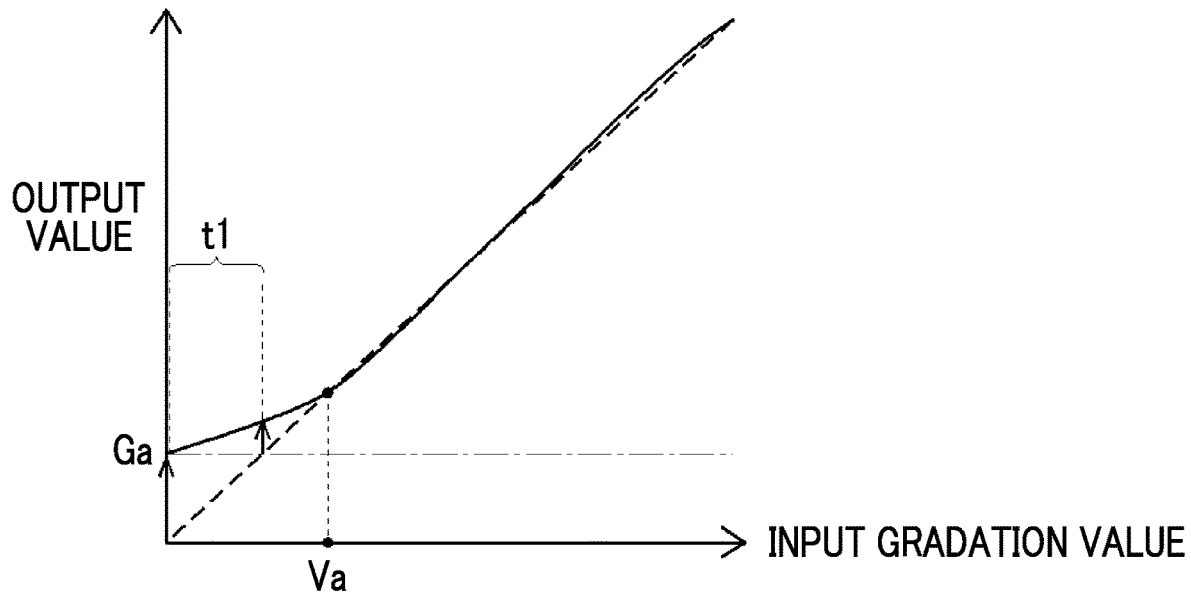
FIG. 8 is a diagram showing another example of the first gradation correction.

The invention is not limited thereto, and as shown in FIG. 8, over the entire region of the first gradation portion including the region where the input gradation value is near the lower limit value, the correction amount may be set to be greater as the difference between the input gradation value and the first reference value Va is greater.

Figure 9:
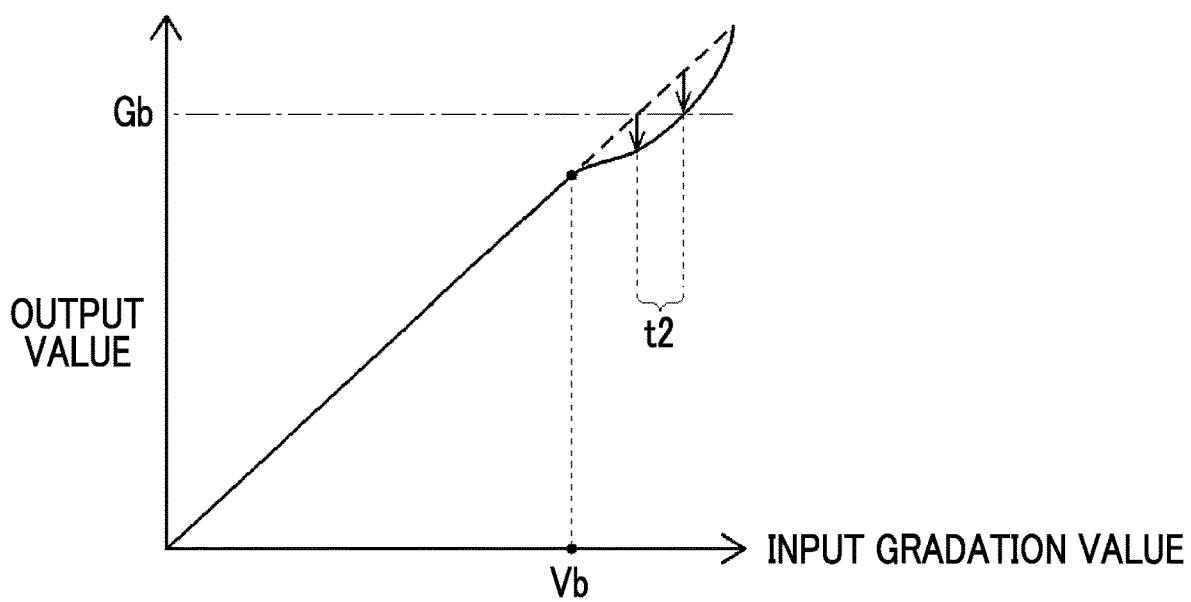
FIG. 9 is a diagram showing an example of second gradation correction.

The second gradation correction is executed in a case where the intensity of the ambient light is equal to or less than the second threshold value, and as shown in FIG. 9, is correction for decreasing an output value with respect to an input gradation value of a second gradation portion less than the γ corrected output value. The second gradation portion is a portion in the angle of view at the time of imaging where the input gradation value is equal to or greater than a second reference value, that is, a high gradation portion (bright portion). The second reference value (a value Vb in FIG. 9) is set to a numerical value corresponding to ⅔ to ¾ of a median value in a numerical value range (for example, 0 to 255) defining the input gradation value.

With the second gradation correction, the output value of the second gradation portion is corrected from a value on a broken line and a value on a solid line in FIG. 9, and is a gradation value lower than a γ corrected value. That is, the lightness of the second gradation portion after the second gradation correction is executed appears darker than the lightness of the display video in a case where the correction is not executed, that is, the second standard video. With this, for example, in a case where the user looks in the finder 30 during imaging under dark ambient light, the user can more easily view the second gradation portion while the eye of the user is adapted to brightness. That is, a portion in the display video displayed on the display 31 that is hardly viewed since the γ corrected output value exceeds a given value (in FIG. 9, a value indicated by a symbol Gb), and specifically, a portion indicated by a symbol t2 in FIG. 9 is easily viewed by the second gradation correction.

In the first embodiment, in a case where the intensity of the ambient light is equal to or less than the second threshold value, determination is made whether or not the second gradation portion in the angle of view has a predetermined width or more, and specifically, whether or not the number of pixels configuring the second gradation portion is equal to or greater than a predetermined number (S025). Then, in a case where the second gradation portion has the predetermined width or more, the second gradation correction is executed, and display data indicating the corrected output value is created. With this, in a case where the effect of the correction is effectively exhibited, the second gradation correction is executed, and on the contrary, in a case where the second gradation portion is too small and the effect of the correction is not sufficiently obtained, the execution of the second gradation correction can be omitted.

From a viewpoint of improving the visibility of the user, it is desirable that, as shown in FIG. 9, a correction amount of the second gradation correction is set to be greater as a difference between the input gradation value of the second gradation portion and the second reference value Vb is greater. That is, as the input gradation value of the second gradation portion is higher, the correction amount in correcting the output value with respect to the input gradation value is preferably set to be greater.

As in a case of the first gradation correction, in consideration of the balance between the display video and the actual video, in a region in the second gradation portion where the input gradation value is near the upper limit value, as shown in FIG. 9, the correction amount of the second gradation correction is preferably set to be gradually smaller as the input gradation value is higher.

Figure 10:
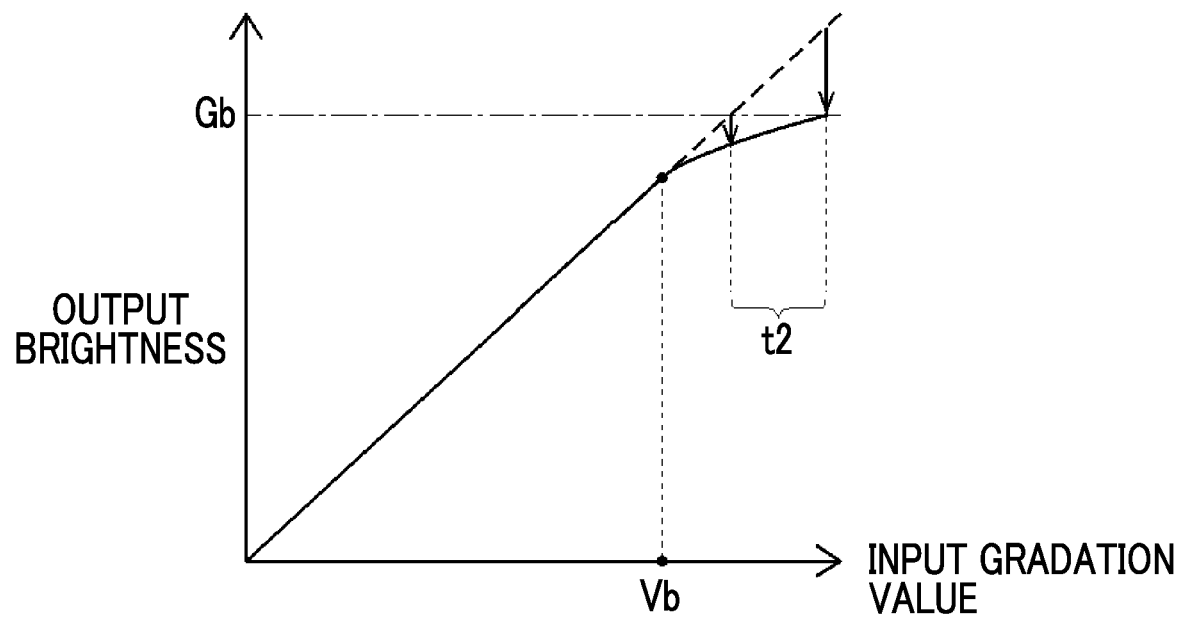
FIG. 10 is a diagram showing another example of the second gradation correction.

The invention is not limited thereto, and as shown in FIG. 10, over the entire region of the second gradation portion including the region where the input gradation value is near the upper limit value, the correction amount may be set to be greater as the difference between the input gradation value and the second reference value Vb is greater.

Figure 11:
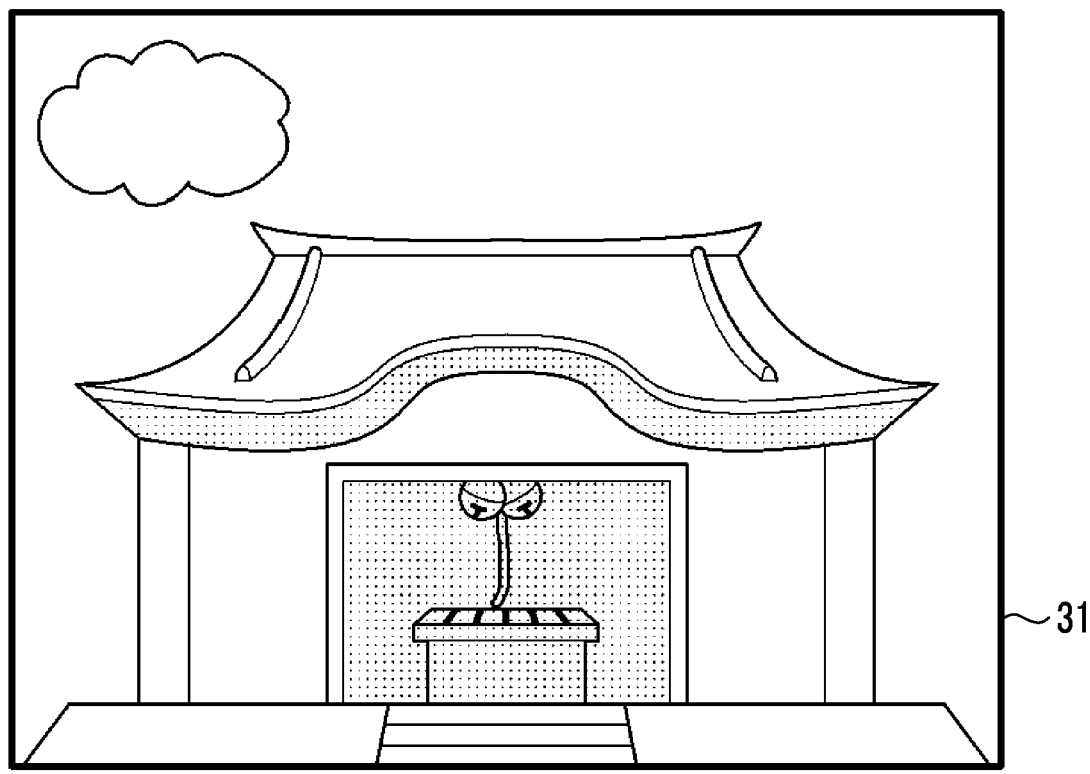
FIG. 11 is a diagram (first view) showing an example of a display video displayed on a display.
Figure 12:
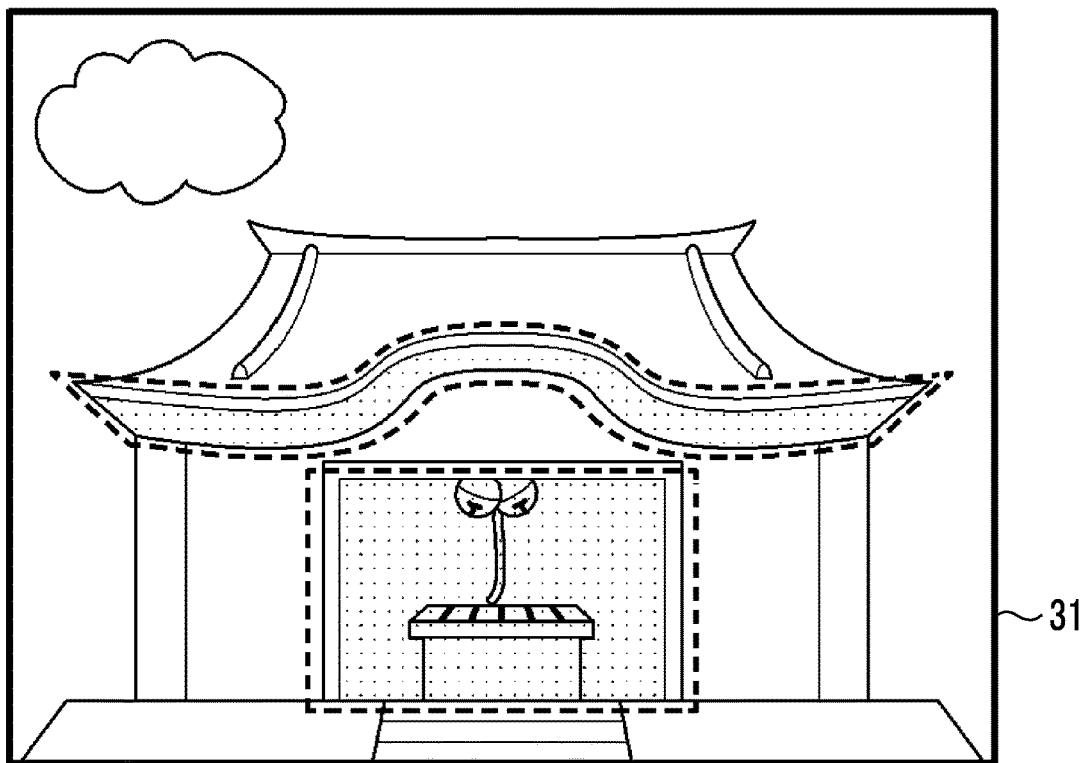
FIG. 12 is a diagram (second view) showing an example of a display video displayed on the display.
Figure 13:
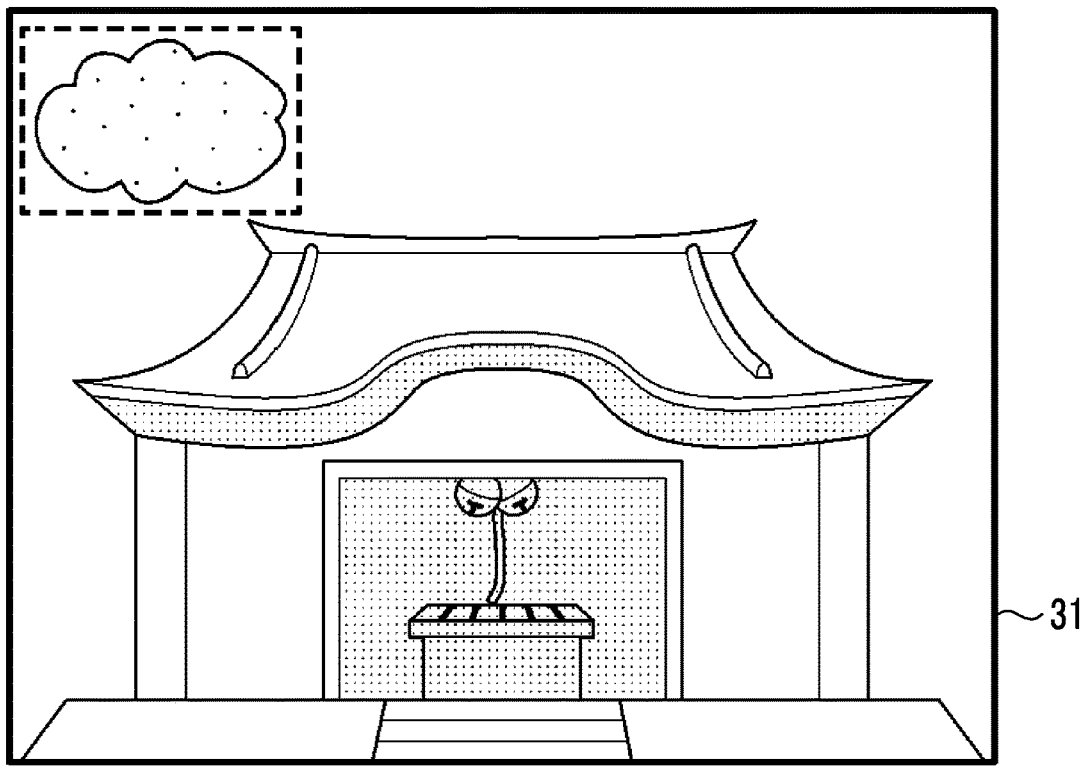
FIG. 13 is a diagram (third view) showing an example of a display video displayed on the display.

The video display flow in the first embodiment will be described again referring to FIGS. 11 to 13. FIGS. 11 to 13 show an example of a display video displayed on the display 31, and the video shown in each drawing is a video obtained by imaging the same subject. The display video shown in FIG. 11 is a video captured in a case where the intensity of the ambient light is within the normal range, and corresponds to the first standard video and the second standard video. In the video shown in each drawing, a first gradation portion and a second gradation portion are present. For example, in each drawing, a portion positioned inside a roof of a building and a portion positioned on a deep side of the inside of the building corresponds to the first gradation portion (a portion surrounded by a broken line in FIG. 12), and a cloud positioned beside the building corresponds to the second gradation portion (a portion surrounded by a broken line in FIG. 13).

In a case where the intensity of the ambient light is within the normal range, the display video shown in FIG. 11, that is, the display video (the first standard video or the second standard video) with lightness corresponding to the γ corrected output value is displayed on the display 31 according to the uncorrected display data.

On the other hand, in a case where the intensity of the ambient light is equal to or greater than the first threshold value (hereinafter, referred to as a bright environment), the display data indicating the γ corrected output value, that is, the uncorrected display data is temporarily created, and the display video corresponding to the uncorrected display data is displayed on the display 31. In this case, in a case where the user looks in the finder 30, the first gradation portion (dark portion) in the display video is hardly viewed. This is because, in a case where the user looks in the finder 30 in the bright environment, the pupil of the user is closed immediately afterward, and the first gradation portion is hardly identified until the eye of the user is adapted to darkness.

For this reason, in the bright environment, the lightness of the display video displayed on the display 31 is brighter than the lightness of the first standard video. Specifically, in the creation step, the correction (in detail, first gradation correction) is executed on the γ corrected output value, and display data indicating the corrected output value is created. Thereafter, in the display step, a display video corresponding to the display data indicating the corrected output value, that is, a display video in which the first gradation portion has higher gradation is displayed on the display 31. As a result, as shown in FIG. 12, the lightness of the first gradation portion (in FIG. 12, a portion surrounded by a broken line) in the display video is brighter than the lightness of the first gradation portion in the first standard video, and the first gradation portion is easily viewed by the user.

In a case where the intensity of the ambient light is equal to or less than the second threshold value (hereinafter, referred to as a dark environment), uncorrected display data indicating the γ corrected output value is temporarily created, and a display video corresponding to the uncorrected display data is displayed on the display 31. In this case, in a case where the user looks in the finder 30, the second gradation portion (bright portion) of the display video is hardly viewed. This is because, in a case where the user looks in the finder 30 in the dark environment, the pupil of the user is opened immediately afterward, and the second gradation portion is hardly identified until the eye of the user is adapted to brightness.

For this reason, in the dark environment, the lightness of the display video displayed on the display 31 is set to be darker than the lightness of the second standard video. Specifically, in the creation step, the correction (in detail, the second gradation correction)) is executed on the γ corrected gradation value, and display data indicating the corrected output value is created. Thereafter, in the display step, a display video corresponding to the display data indicating the corrected output value, that is, a display video in which the second gradation portion has lower gradation is displayed on the display 31. As a result, as shown in FIG. 13, the lightness of the second gradation portion (in FIG. 13, a portion surrounded by a broken line) in the display video is darker than the lightness of the second gradation portion in the second standard video, and the second gradation portion is easily viewed by the user.

It is preferable that the correction amount (that is, the correction amount to the output value) in executing the correction in the creation step is changed depending on an amount of light leaking into the finder 30. This is because, in a case where a large amount of light enters the finder 30, the visibility of the display 31 is degraded. Specifically, in the correction, the distance between the user and the finder 30 is measured by a distance-measuring sensor or the like or the lightness in the finder 30 is measured by a light-measuring sensor or the like. A measurement result is a parameter for determining the leakage amount of light into the finder 30, and thus, the correction amount is preferably set corresponding to the parameter. With this, it is possible to adjust the lightness of the display video (in particular, the first gradation portion and the second gradation portion) displayed on the display 31 to be more easily viewed while considering the leakage amount of light into the finder 30.

A correspondence relationship between the parameter and the correction amount may be made into a mathematical expression in advance and stored as a conversion expression or may be stored as data in a format of a conversion table and referred to at the time of correction execution.

Figure 14:
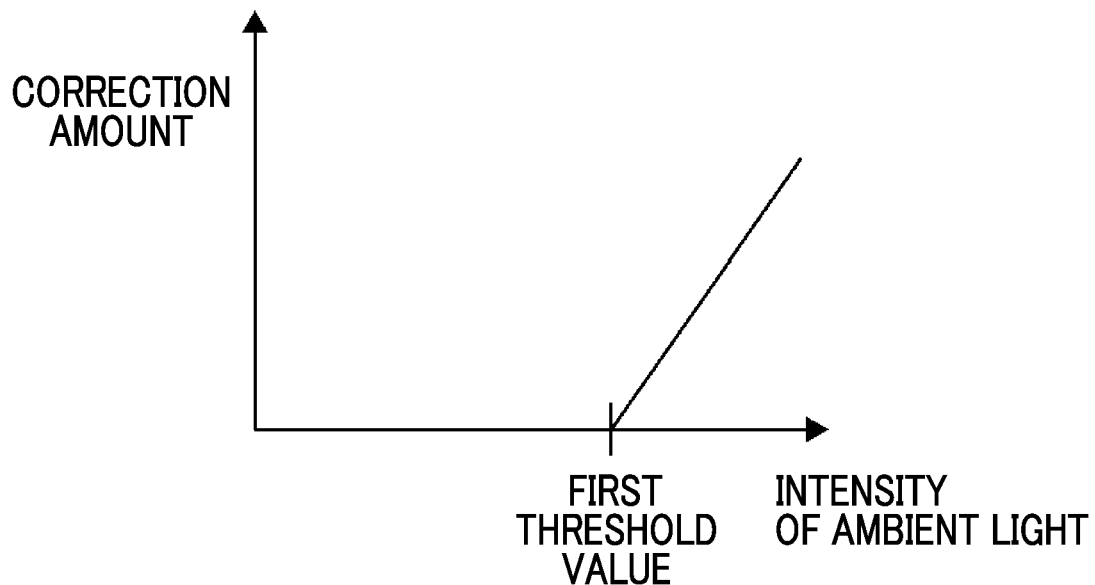
FIG. 14 is a diagram showing a correspondence relationship between intensity of ambient light and a correction amount in the first gradation correction.

The correction amount may be changed depending on the intensity of the ambient light, and strictly, depending on intensity detected by a sensor for light detection. Specifically, as shown in FIG. 14, as the difference between the intensity of the ambient light and the first threshold value is greater, the correction amount in the first gradation correction may be set to be greater. FIG. 14 is a diagram showing a correspondence relationship between a correction amount and intensity of light in a case where a correction amount in executing the first gradation correction on a certain output value is changed depending on the intensity of the ambient light.

Figure 15:
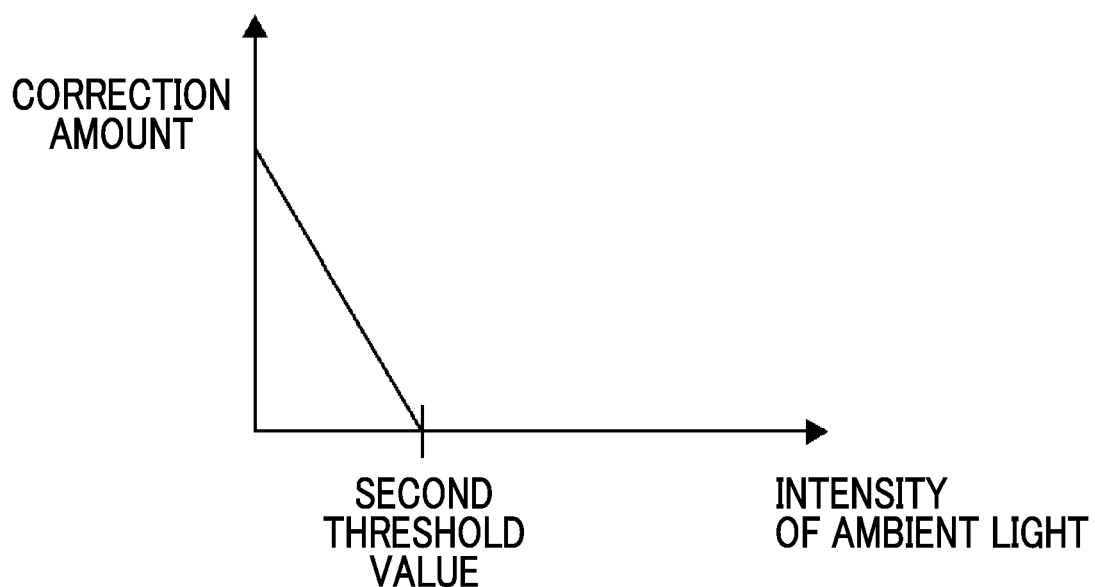
FIG. 15 is a diagram showing a correspondence relationship between the intensity of ambient light and a correction amount in the second gradation correction.

Similarly, as shown in FIG. 15, as the difference between the intensity of the ambient light and the second threshold value is greater, the correction amount in the second gradation correction may be set to be greater. FIG. 15 is a diagram showing a correspondence relationship between a correction amount and intensity of light in a case where a correction amount in executing the second gradation correction on a certain output value is changed depending on the intensity of the ambient light.

The user may set a correction amount in advance before correction execution. Specifically, the user may perform a setting operation (for example, an operation to input a correction amount) through the operating unit 24 or the like, and the video creation unit 44 of the processor 40 may set the correction amount in response to the setting operation. While the correction amount in executing the correction on the output value is generally determined depending on an imaging scene, a subject, and the like, the user may request to more clearly view a portion (for example, the first gradation portion and the second gradation portion) in the display video. On the contrary, the user may not care about a way of viewing the display video. In such a case, in a case where the correction amount can be set based on the setting operation of the user, the lightness of the first gradation portion and the second gradation portion can be adjusted corresponding to user's preference, and user's convenience is improved.

In the first embodiment, in a case where the user starts to use the finder 30, the processor 40 counts a usage time. The usage of the finder 30 means that the user looks in the display 31 in the finder 30, and the usage time is an elapsed time from when the user starts to look in the display 31. The usage time may a display time of the display video of the display 31 or may be a time measured by another method. In regard to the usage time, a set time is set in advance, and a required time necessary until the eye of the user is adapted to darkness or brightness is set as the set time.

In the first embodiment, in a case of the bright environment or the dark environment, as shown in FIG. 5, determination is made whether or not the usage time reaches the set time (S029). Then, a display data created in the creation step is changed, in other words, the lightness of a display video displayed on the display 31 in the display step is changed depending on whether or not the usage time reaches the set time.

Specifically, before the usage time reaches the set time, in the creation step, the correction (specifically, the first gradation correction or the second gradation correction) is executed on the output value, and display data indicating the corrected output value is created. Then, in the display step, a display video corresponding to the display data indicating the corrected output value is displayed on the display 31.

On the other hand, after the usage time reaches the set time, in the creation step, uncorrected display data indicating an output value (that is, the output value after the γ correction) on which the correction is not executed is created (S031). Then, in the display step, a display video corresponding to the uncorrected display data is displayed on the display 31. This is because the eye of the user is adapted to darkness or brightness when the usage time reaches the set time, and thereafter, and the lightness of the display video (in particular, the first gradation portion and the second gradation portion) displayed on the display 31 does not need to be changed any longer.

Figure 16:
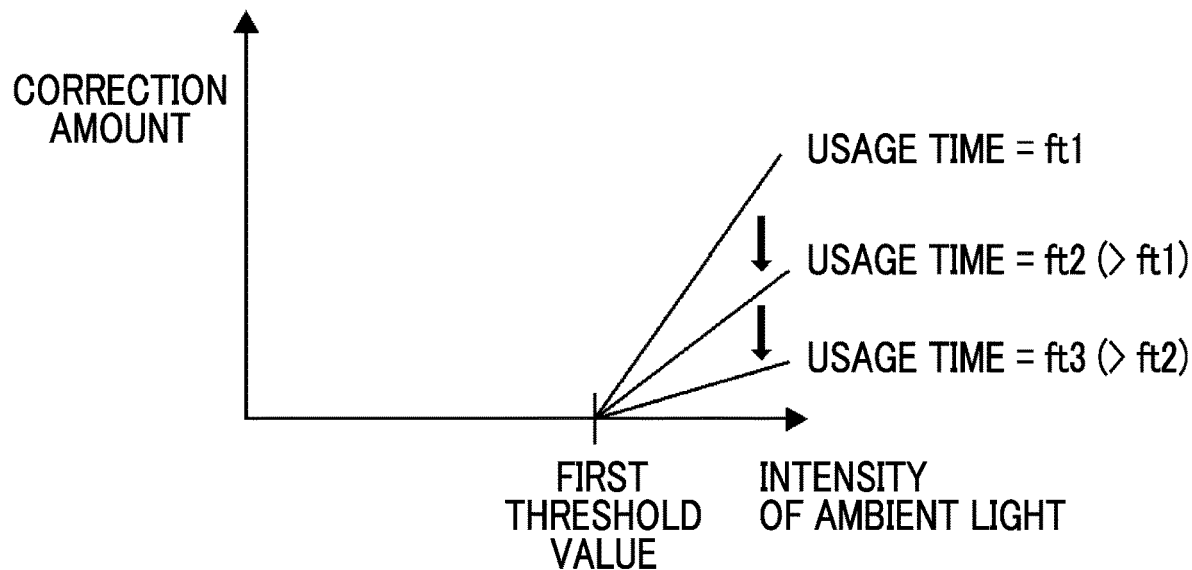
FIG. 16 is a diagram showing change in correction amount in the first gradation correction after a usage time of a finder reaches a set time.
Figure 17:
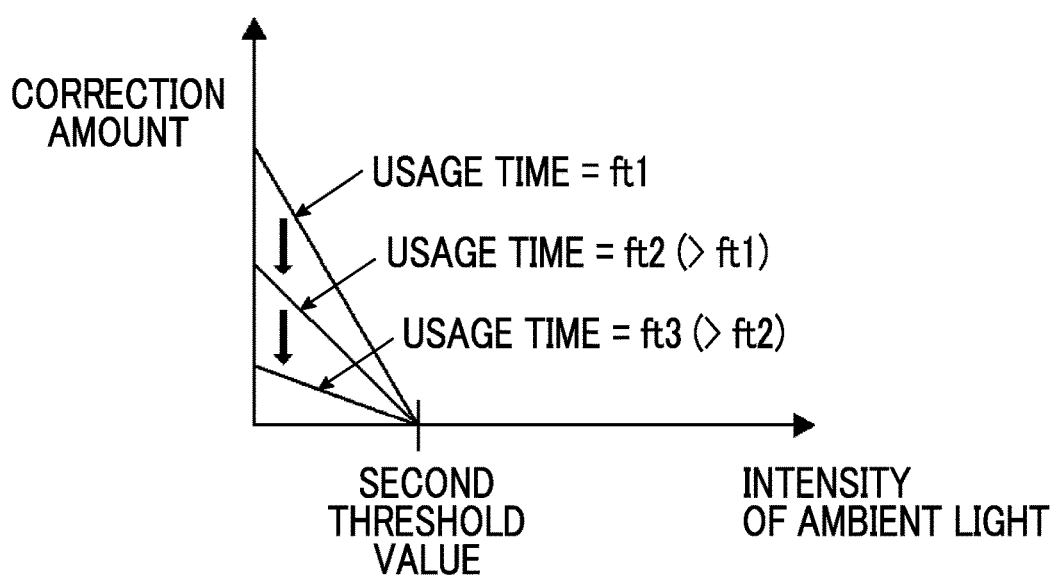
FIG. 17 is a diagram showing change in correction amount in the second gradation correction after the usage time of the finder reaches the set time.

In consideration of the visibility of the video, after the usage time reaches the set time, as shown in FIGS. 16 and 17, the display data indicating the corrected output value may be created while gradually decreasing the correction amount to the output value depending on the usage time. In this case, in the subsequent display step, the lightness of the display video (in particular, the first gradation portion and the second gradation portion) displayed on the display 31 is gradually changed and approaches lightness in an uncorrected state as the usage time is longer. Finally, in the creation step, display data with the correction amount of 0, that is, uncorrected display data is created, and in the display step, a display video corresponding to the uncorrected display data, that is, a display video with lightness corresponding to the output value after the γ correction is displayed on the display 31.

Figure 18:
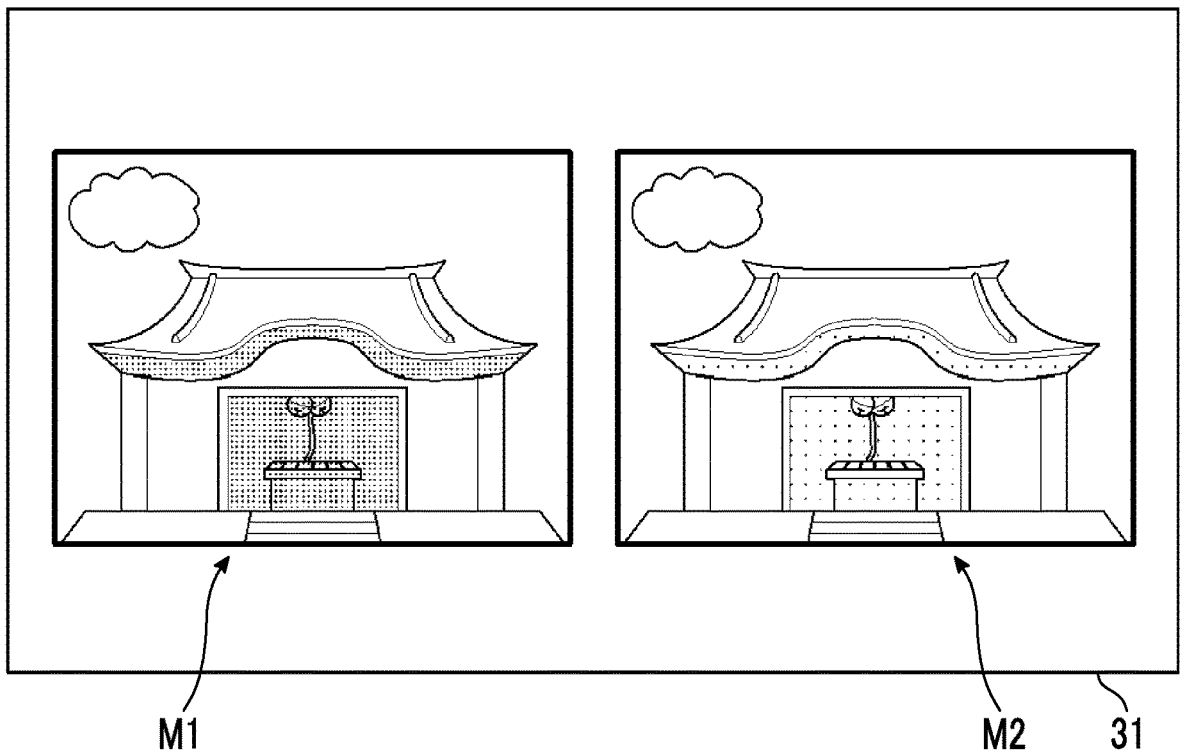
FIG. 18 is a diagram showing the display on which a display video on which correction is executed and a display video on which correction is not executed are displayed simultaneously.

As a configuration different from the above-described configuration, for example, in a case where the bright environment or the dark environment, in the creation step, the correction may be executed to create display data indicating a corrected output value, and uncorrected display data may be created. Then, in the display step, as shown in FIG. 18, a display video (in the drawing, denoted by a symbol M1) corresponding to the display data indicating the corrected output value and a display video (in the drawing, denoted by a symbol M2) corresponding to the uncorrected display data may be displayed on the display 31 together (simultaneously). In this case, the user can simultaneously view a display video that is easily viewed b the correction and an uncorrected display video (that is, a video reflecting video data to be stored) on the display 31. As a result, the user can confirm that the video data is normal data (so-called washed-out highlight or blocked-up shadow do not occur). In this case, the fact that the user can confirm the gradation of the dark portion or the bright portion from the corrected display data or the uncorrected display data means that a gradation securely remains in the video data to be stored.

In the above-described configuration, upon changing the lightness of the display video displayed on the display 31, as the output value, the gradation value (output gradation value) indicated by the display data is changed; however, other output values are considered. For example, as the output value, an output value (hereinafter, referred to as output brightness) indicating the brightness of the backlight in the display 31, that is, physical brightness may be changed. In this case, the control processing unit 42 calculates output brightness from an output gradation value indicated by display data and controls the brightness of the backlight for each pixel based on the calculated output brightness.

Figure 19:
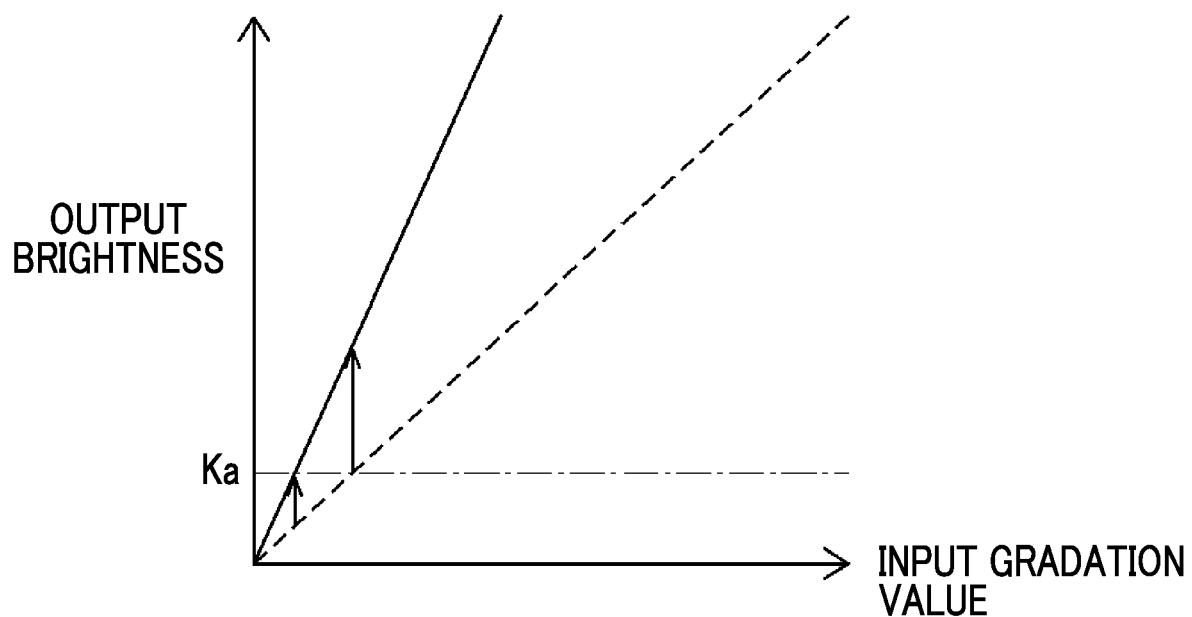
FIG. 19 is a diagram showing a case of changing output brightness in a bright environment.

The output brightness is changed depending on the intensity of the ambient light, and for example, in a case where the intensity of the ambient light is equal to or greater than the first threshold value, the output brightness is changed from a value on a broken line to a value on a solid line in FIG. 19, and is higher than in a case where only the γ correction is executed. With this, in the bright environment, a portion in the display video displayed on the display 31 that is hardly viewed since the output brightness falls below a given value (a value Ka in FIG. 19) only by the γ correction, that is, the first gradation portion is easily viewed.

Figure 20:
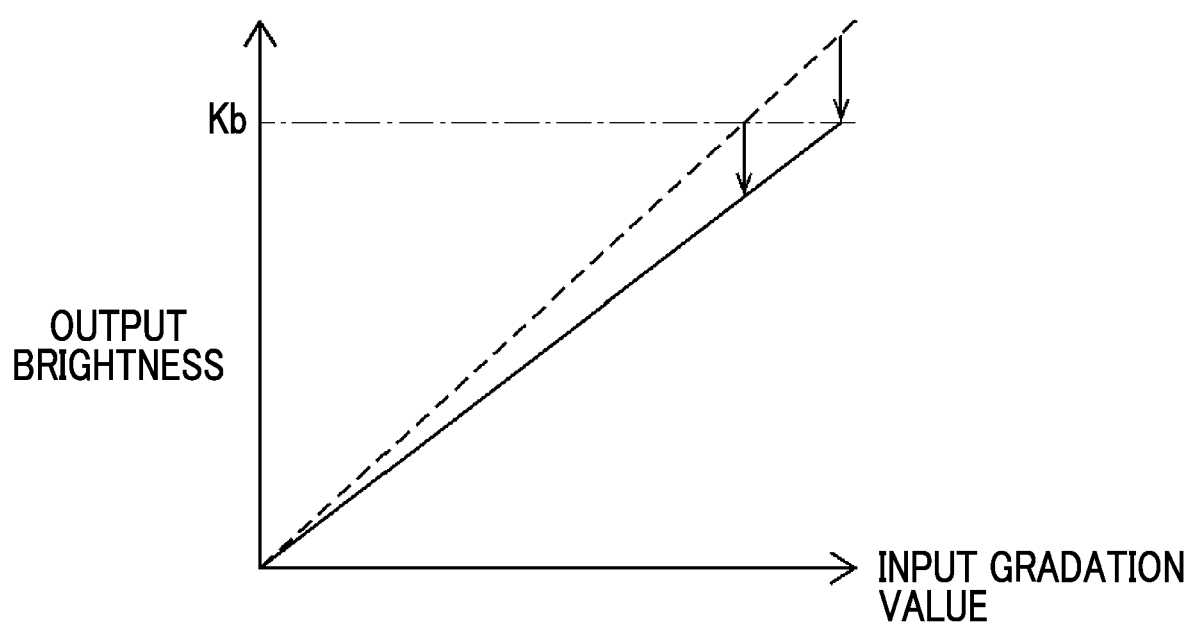
FIG. 20 is a diagram showing a case of changing output brightness in a dark environment.

In a case where the intensity of the ambient light is equal to or less than the second threshold value, the output brightness is changed from a value on a broken line to a value on a solid line in FIG. 20, and is lower than in a case where only the γ correction is executed. With this, in the dark environment, a portion in the display video displayed on the display 31 that is hardly viewed since the output brightness exceeds a given value (a value Kb in FIG. 20) only by the γ correction, that is, the second gradation portion is easily viewed.

In a case where the display 31 is configured with a liquid crystal display or the like, a degree of rotation of light (polarization plane) by liquid crystal molecules may be changed to change the lightness of the display video displayed on the display 31.

In the first embodiment, although the correction is executed in each of the bright environment and the dark environment, the correction may be executed in either the bright environment or the dark environment. That is, only in a case where the intensity of the ambient light is equal to or greater than the first threshold value, the output value may be corrected to create the display data indicating the corrected output value in the creation step. Alternatively, only in a case where the intensity of the ambient light is equal to or less than the second threshold value, the output value may be corrected to create the display data indicating the corrected output value in the creation step.

Second Embodiment

In the first embodiment, the correction (in detail, additional correction to the output value after the γ correction) is executed depending on the intensity of the ambient light to create the display data. Note that, in the first embodiment, video data to be a source of display data is not corrected and is stored in the storage device while keeping the content as it is.

On the other hand, a form in which video data is corrected, that is, a form in which a gradation value (input gradation value) indicated by video data is also considered. The form is referred to as a second embodiment, and hereinafter, the second embodiment will be described.

Hereinafter, matters of the second embodiment that are different from the first embodiment will be primarily described, and in the equipment configuration of the second embodiment, pieces of equipment common to the first embodiment are represented by the same reference numerals as in the first embodiment. In the following description, the term "video data is corrected" means that a gradation value indicated by video data is corrected.

Configuration of Imaging Apparatus in Second Embodiment

In the second embodiment, as in the first embodiment, an imaging apparatus 10 is used as a display apparatus. The imaging apparatus 10 according to the second embodiment is generally common to the imaging apparatus 10 according to the first embodiment, and the function of the processor 40 is different from the first embodiment.

In the second embodiment, the control processing unit 42 of the processor 40 reminds the user of the usage of the finder 30 in displaying a predetermined display video on the display 31. Here, reminding of the usage of the finder 30 refers to, for example, displaying a message or the like for prompting the user to use the finder 30 during imaging on the rear display 22. The invention is not limited thereto, and for example, a display destination of a display video may be switched from the rear display 22 to the display 31, and video display on the rear display 22 may be forcibly used to prompt the user to use the finder 30.

Figure 21:
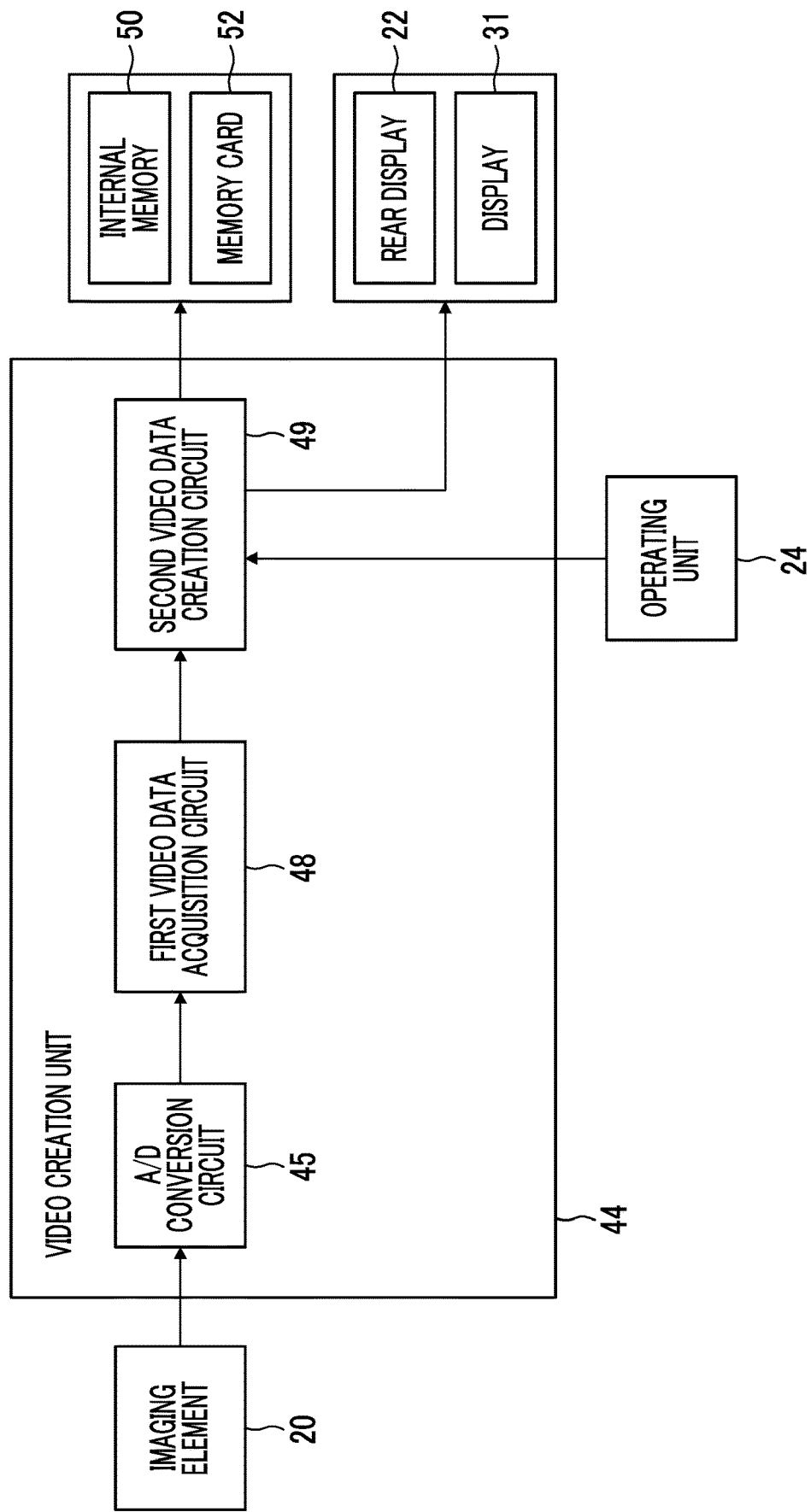
FIG. 21 is a diagram showing the configuration of a video creation unit according to a second embodiment.

In the second embodiment, as shown in FIG. 21, the video creation unit 44 of the processor 40 includes an A/D conversion circuit 45, a first video data acquisition circuit 48, and a second video data creation circuit 49.

The first video data acquisition circuit 48 executes image processing, such as γ correction and white balance correction, on a video signal converted into a digital signal by the A/D conversion circuit 45, and compresses a processed signal in a predetermined standard to acquire first video data. That is, the first video data is the same data as the video data according to the first embodiment.

The second video data creation circuit 49 creates a plurality of pieces of second video data indicating different gradation values based on the first video data. Specifically, the second video data creation circuit 49 executes partial gradation correction on the first video data multiple times, and in more detail, executes the first gradation correction and the second gradation correction with different correction amounts. With this, a plurality of pieces of second video data on which the correction is executed with different correction amounts are created.

A plurality of pieces of created second video data include at least one second video data on which the correction is executed, but may include second video data on which the correction amount is 0 (that is, the correction is not executed) as reference data.

In the creation of the second video data, the correction is not limited to the correction on a part of the gradation value indicated by the first video data, but the correction may be executed on all gradation values indicated by the first video data. In this case, each of a plurality of pieces of second video data indicates a gradation value on which correction (specifically, γ correction or knee correction using a γ curve of a shape different from a normal one) different from the normal γ correction is executed.

In the second embodiment, the processor 40 displays a display video corresponding to each of a plurality of pieces of created second video data on the display 31. The display video corresponding to each of a plurality of pieces of second video data is a video that is displayed on the display 31 corresponding to each piece of converted data obtained by executing predetermined conversion processing on each piece of second video data and converting each piece of second video data into data for display (display data).

Video Display Flow in Second Embodiment

Next, a video display flow in the second embodiment will be described.

Figure 22:
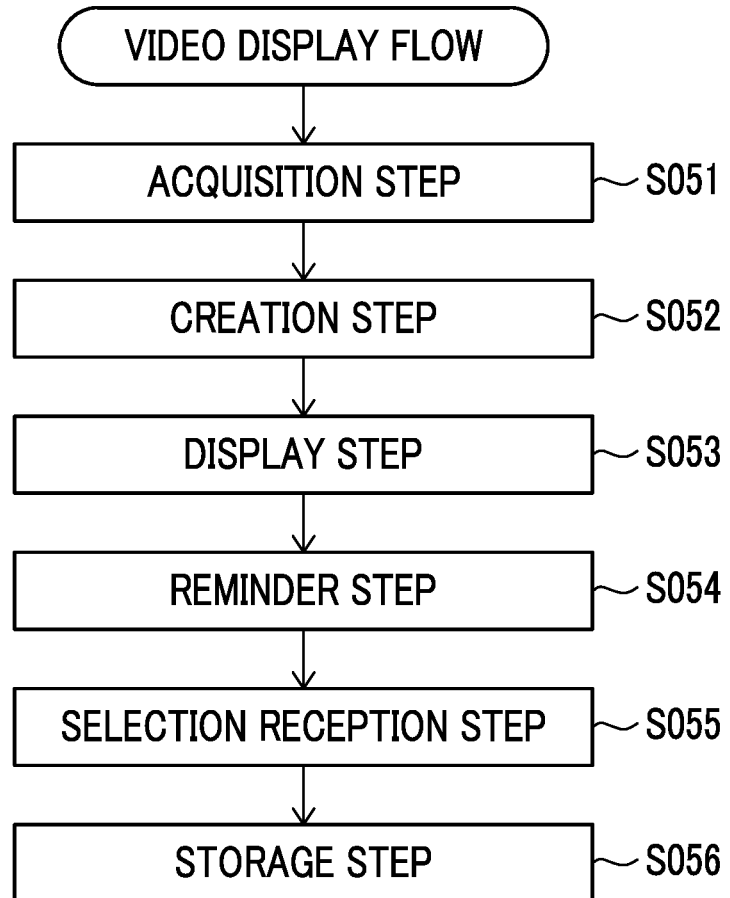
FIG. 22 is a diagram showing a video display flow in the second embodiment.

The video display flow in the second embodiment is executed while the user performs imaging using the imaging apparatus 10. In the video display flow in the second embodiment, a video (live view image) of a subject being imaged is displayed as a display video on the display 31 by a display method according to the second embodiment of the invention. As shown in FIG. 22, the video display flow in the second embodiment includes an acquisition step S051, a creation step S052, a display step S053, a reminder step S054, a selection reception step S055, and a storage step S056, and such steps are executed by the processor 40.

In the acquisition step S051, first video data is acquired by imaging. Specifically, the first video data acquisition circuit 48 of the processor 40 acquires first video data from a video signal output from the imaging element 20 as needed during imaging. In a case where the exposure conditions are changed during imaging, in the acquisition step S051, a plurality of pieces of first video data with different exposure conditions, that is, the first video data before the change of the exposure conditions and the first video data after the change of the exposure conditions are acquired.

In the creation step S052, a plurality of pieces of second video data indicating different gradation values are created based on the first video data. Specifically, the second video data creation circuit 49 of the processor 40 executes correction on the first video data with different correction amounts multiple times.

In more detail, a plurality of first gradation corrections are executed on a gradation value in the first video data equal to or less than the first reference value while changing the correction amount. Similarly, a plurality of second gradation corrections are executed on a gradation value in the first video data equal to or greater than the second reference value while changing the correction amount. With this, a plurality of pieces of second video data including the second video data on which the first gradation correction is executed and the second video data on which the second gradation correction is executed are created.

Hereinafter, a case where the correction amount of each of the first gradation correction and the second gradation correction is set in three stages (+1, 0, −1), and the two kinds of correction are executed with the correction amount in each stage to create nine pieces of second video data in total will be described as an example. In such a case, among the nine pieces of second video data, second video data on which the correction amount is 0 (that is, both the first gradation correction and the second gradation correction are not executed) is included as reference data.

In the display step S053, a plurality of display videos (that is, nine display videos) corresponding to the nine pieces of second video data are displayed on the display 31. In the display step S053, two or more display videos are displayed on the display 31 simultaneously, and for example, as shown in FIG. 23, the nine display videos are arranged and displayed in a matrix.

Figure 23:
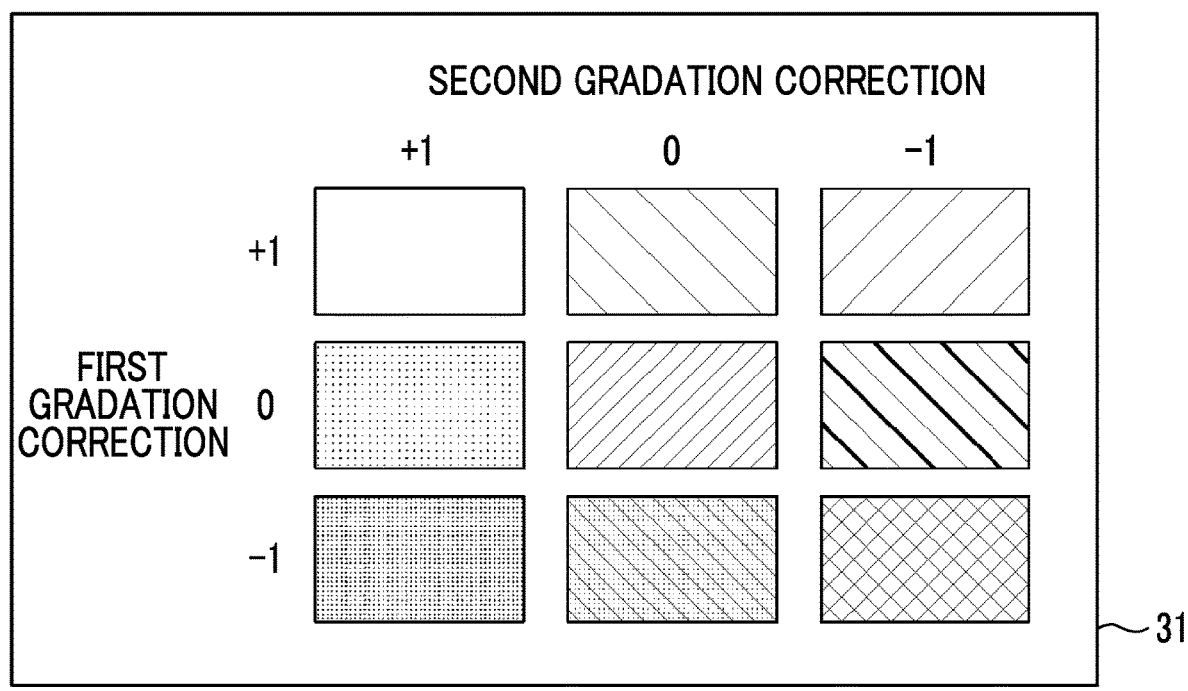
FIG. 23 is a diagram showing the display on which a plurality of display videos are displayed.

In FIG. 23, for convenience of illustration, each display video is shown in a simplified manner. In the drawing, display videos on which the stage of the correction amount of the first gradation correction is "+1" are disposed on a first row from the top, display videos on which the stage of the correction amount of the first gradation correction is "0" are disposed on a second row from the top, and display videos on which the stage of the correction amount of the first gradation correction is "−0.1" are disposed on a third row from the top. Display videos on which the stage of the correction amount of the second gradation correction is "+1" are disposed on the leftmost side, display videos on which the stage of the correction amount of the second gradation correction is "0" are disposed at the center, and display videos on which the stage of the correction amount of the second gradation correction is "−1" are disposed on the rightmost side.

In the second embodiment, as in the first embodiment, in a case where the distance between the user and the imaging apparatus 10 is equal to or less than the predetermined distance, a display video may be displayed on the display 31. With this, it is possible to efficiently display a display video on the display 31 corresponding to the distance between the user and the imaging apparatus 10.

The reminder step S054 is executed in a case where the nine display videos are displayed on the display 31. In the reminder step S054, for example, a message or the like for reminding the user of usage of the finder 30 is displayed on the rear display 22. With this, it is possible to appropriately guide the user to look in the finder 30 and to view the display 31. Then, the user can compare the nine display videos displayed on the display 31. In this case, in a case where a display video corresponding to the second video data on which the correction amount is 0 is included as a reference video among the nine display videos, the user can compare the reference video with other display videos.

In the flow shown in FIG. 22, although the reminder step S054 is executed after the display step S053, the invention is not limited thereto, and the reminder step may be executed before the display step or the reminder step and the display step may be executed together.

In the selection reception step S055, a user's selection operation through the operating unit 24 while the nine display videos are displayed on the display 31 is received. In the selection operation, the user selects one video, for example, a video that clearly shows the first gradation portion and the second gradation portion and is most easily viewed, from among the nine display videos, and inputs a selection result through the select button 26 or the like.

In the storage step S056, the second video data corresponding to the display video selected by the user from among the nine display videos is specified based on the received selection operation, and the second video data is stored in the internal memory 50, the memory card 52, or the like.

As described above, in the second embodiment, the display videos (specifically, nine display videos) corresponding to a plurality of pieces of second video data on which the correction is executed with different correction amounts are displayed on the display 31 to prompt the user to use the finder 30. With this, the user can compare a plurality of display videos displayed on the display 31, and can recognize what kind of correction makes a video most clear (in other words, the effect of each correction).

In a case where the nine display videos are displayed on the rear display 22, and in a case where the intensity of the ambient light at that time is not appropriate (for example, external light is too strong), there is a concern that the user cannot correctly recognize the clearness of each display video, that is, the effect of the correction.

In contrast, in the second embodiment, the nine display videos are displayed on the display 31 in the finder 30, and thus, it is possible to exclude the influence of the ambient light on each display video. With this, the user can appropriately confirm each display video, and thus, the user can correctly select the second video data to be stored.

In a case where the user looks in the finder 30 in a situation in which the intensity of the ambient light is high, such as a situation in which external light is too strong, the display video of the display 31 is hardly viewed until the eye is adapted to darkness. In consideration of this, the display video is preferably displayed on the display 31 when a given time elapses after the user looks in the finder 30. Alternatively, as in the first embodiment, the lightness of the display video displayed on the display 31 may be adjusted depending on the intensity of the ambient light (that is, the gradation value indicated by the second video data may be corrected depending on the intensity of the ambient light).

In the second embodiment, the second video data corresponding to the display video selected by the user among the nine display videos is stored. With this, the second video data to be stored can be determined from among a plurality of pieces of second video data while reflecting the user's intention, and thus, user's convenience is improved.

As described above, in the acquisition step S051 of the second embodiment, a plurality of pieces of first video data with different exposure conditions may be acquired. In this case, in the display step S053, a plurality of display videos based on a plurality of pieces of first video data with different exposure conditions may be displayed on the display 31 along with the nine display videos. The display video based on each of a plurality of pieces of first video data is a video that is displayed on the display 31 corresponding to display data obtained by executing predetermined conversion processing on each piece of first video data acquired before and after the change of the exposure conditions and creating data for display (display data).

As described above, the display videos corresponding to the second video data and the display video based on the first video data after the change of the exposure conditions are displayed on the display 31 together, whereby the user can compare the display videos. With this, the user can confirm the effect of the correction with different correction amounts and the effect of the change of the exposure conditions at the same time. As a result, the user can determine whether or not the change of the exposure conditions is more effective than the gradation correction, upon securing the clearness of a video.

In the second embodiment, a plurality of modes (display modes) in which the nine display videos are displayed on the display 31 in the display step may be prepared.

A first display mode is, for example, a mode in which the nine display videos are arranged and displayed simultaneously in a matrix (one screen display) as shown in FIG. 23. In the mode, a display size per display video is small.

Figure 24:
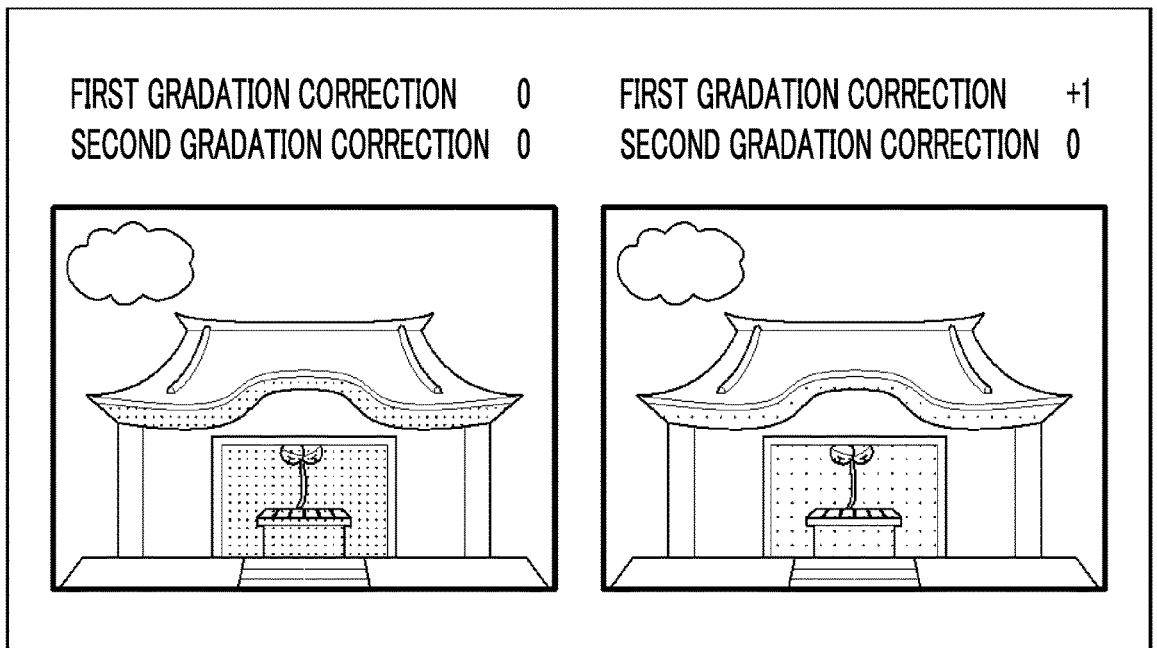
FIG. 24 is a diagram showing another example of a display form of a display video on the display.
Figure 24:
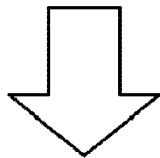
Figure 24:
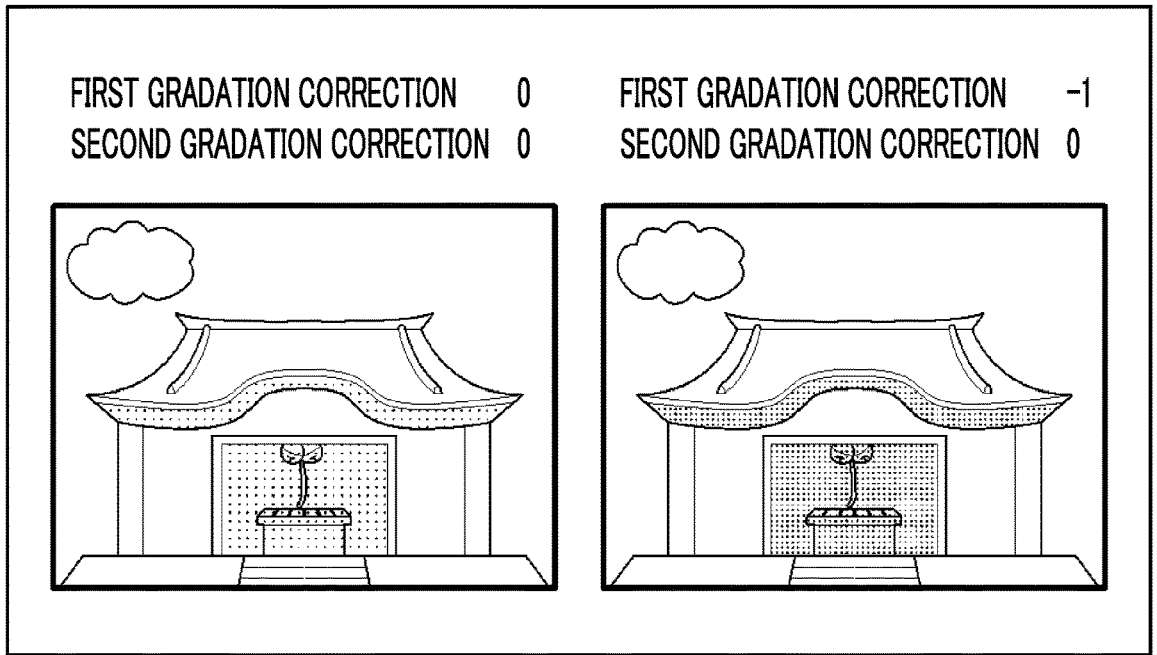

A second display mode is, for example, a mode in which a part of the nine display videos is displayed on the display 31. The number of videos to be displayed in the mode is not particularly limited, and for example, as shown in FIG. 24, two display videos may be displayed on the display 31 together. Here, one of the two display videos may be set as a display video corresponding to the second video data on which the correction is executed, and the other display video may be set as a display video (that is, a display video for reference) corresponding to the second video data on which the correction is not executed.

In the second display mode, the display videos displayed on the display 31 may be switched in response to a switching operation of the user. For example, each time the switching operation is performed, the display video corresponding to the second video data on which the correction is executed may be switched. Specifically, as shown in FIG. 24, switching may be performed to a display video with a different correction amount from a previous display video.

A third display mode is, for example, a mode in which, among the nine display videos, a display video corresponding to the second video data on which first correction is executed and a display video corresponding to the second video data on which second correction is executed are displayed on the display 31 separately. Here, one of the first gradation correction and the second gradation correction corresponds to the first correction, and the other gradation correction corresponds to the second correction.

Figure 25:
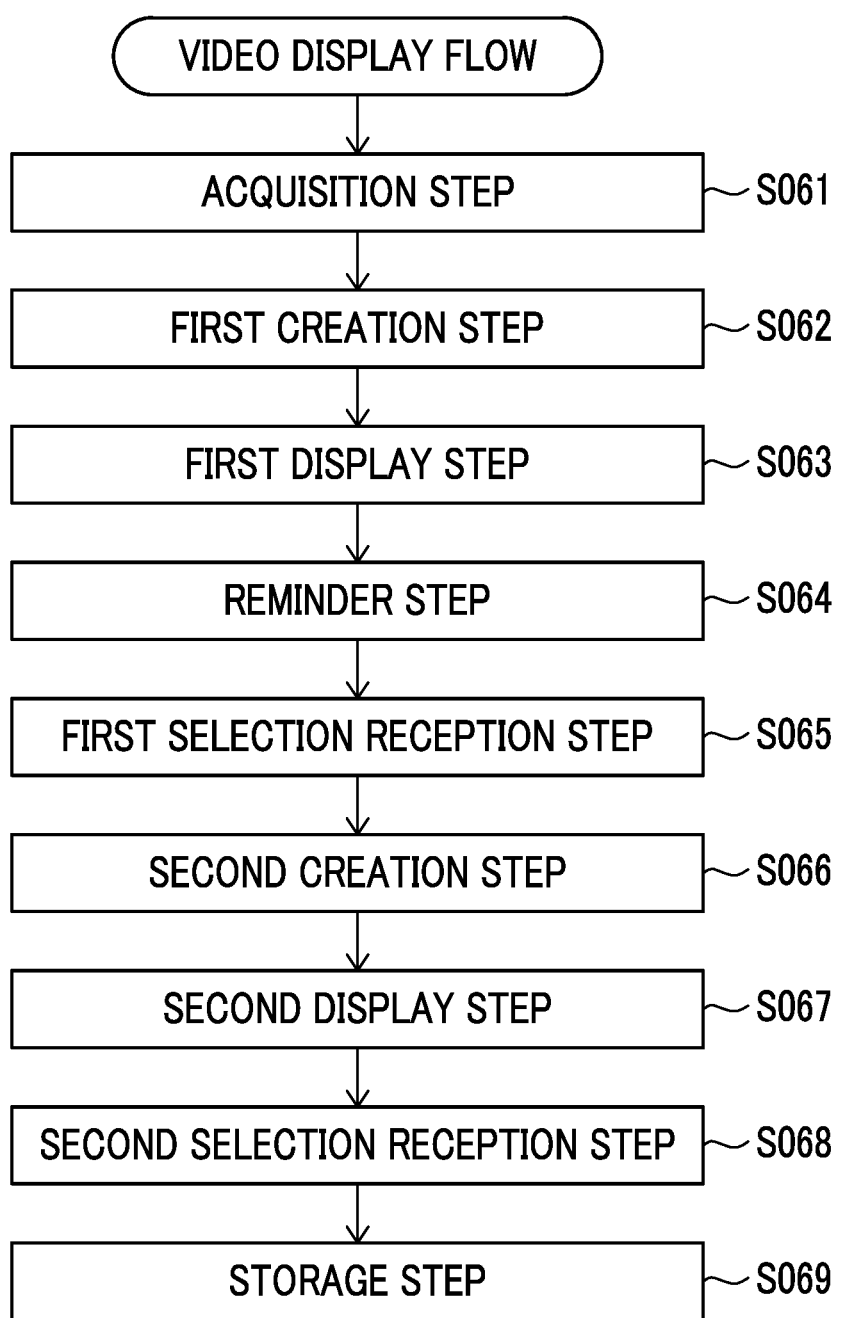
FIG. 25 is a diagram showing a flow of another mode regarding a video display flow in the second embodiment.
Figure 26:
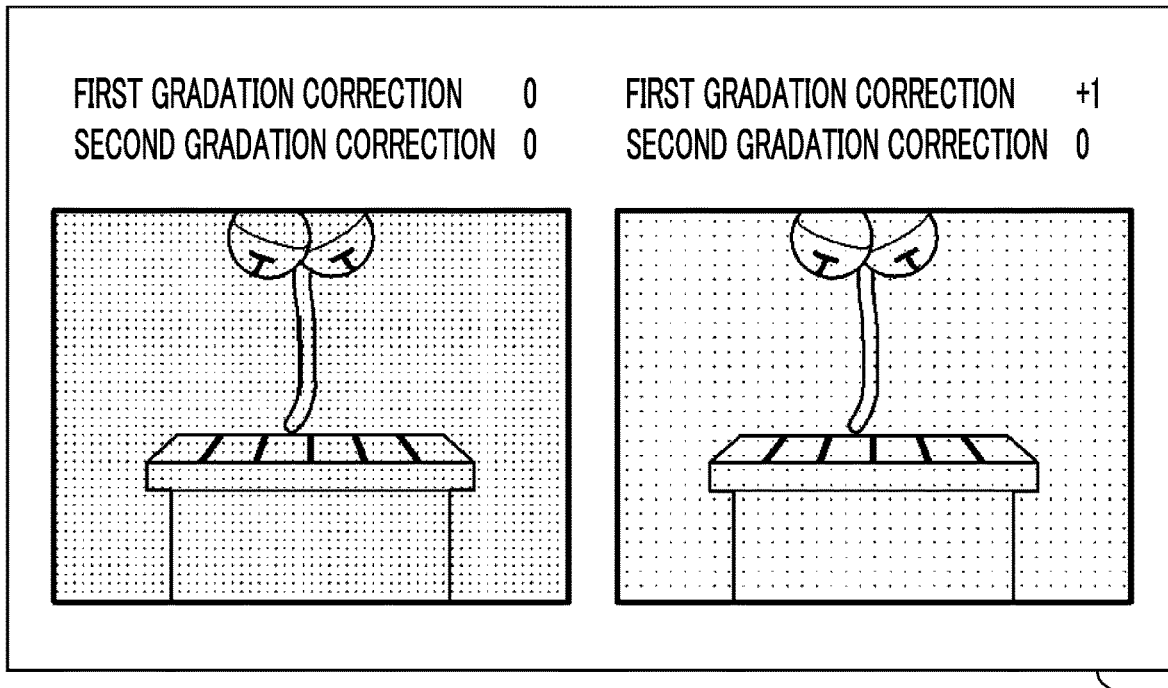
FIG. 26 is a diagram showing the display on which a different portion in the display video is displayed on a magnified scale.

A flow in a case where the display videos are displayed in the third display mode will be described referring to FIG. 25. Hereinafter, description will be provided assuming that the second gradation correction is the first correction and the first gradation correction is the second correction. The contents described below can also be applied to a case where the first gradation correction is the first correction and the second gradation correction is the second correction.

In the third display mode, the creation step includes a first creation step S062 and a second creation step S066. In the third display mode, the display step includes a first display step S063 and a second display step S067, and the selection reception step includes a first selection reception step S065 and a second selection reception step S068.

In the third display mode, after the acquisition step S061 is executed, the first creation step S062 is executed. In the first creation step S062, a plurality of first corrections are executed on the first video data with different correction amounts, and two or more pieces of second-A video data are created. Specifically, the first correction is executed with a correction amount in three stages (for example, a correction amount of +2, +1, and −1 to the dark portion), and three pieces of second-A video data are created. The second-A video data is data that belongs to the second video data.

Thereafter, the first display step S063 is executed, and in the step, three display videos corresponding to the three pieces of second-A video data are displayed on the display 31. The display videos displayed in the first display step S063 include a video in which the gradation value is corrected by the first correction, for example, a video in which the value of the first gradation portion is changed. In this case, the display video for reference on which the correction is not executed may be displayed.

The reminder step S064 is executed during or before the execution of the first display step S063, and the user uses the finder 30 with the reminder step S064 as a trigger. Thereafter, the first selection reception step S065 is executed, and in a case where the user selects one of two or more display videos displayed on the display 31, the processor 40 receives a selection result.

Incidentally, the first selection reception step S065 is executed during the execution of the first display step S063, and thus, the display video selected in the first selection reception step S065 corresponds to the display video selected in the first display step S063.

After the execution of the first selection reception step S065, the second creation step S066 is executed. In the second creation step S066, two or more pieces of second-B video data are created based on the selection result received in the first selection reception step S065. Specifically, the first correction is executed on the first video data with a correction amount selected by the user, and the second correction is executed with a correction amount in three stages (for example, a correction amount of +2, +1, and −1 to the bright portion), whereby three pieces of second-B video data are created. Here, the correction amount selected by the user is the correction amount of the first correction executed in creating the second-A video data corresponding to the display video selected in the first display step S063.

The second-B video data is data that belongs to the second video data.

After the execution of the second creation step S066, the second display step S067 is executed, and in the step, three display videos corresponding to the three pieces of second-B video data are displayed on the display 31. The display videos displayed on the second display step S067 include a video in which the gradation value is corrected by the first correction and the second correction, and in detail, a video in which the value of each of the first gradation portion and the second gradation portion is changed. In this case, the display video for reference on which the correction is not executed may be displayed.

The second selection reception step S068 is executed during the execution of the second display step S067, and in a case where the user selects one of two or more pieces of display videos displayed on the display 31, the processor 40 receives a selection result.

Incidentally, the second selection reception step S068 is executed during the execution of the second display step S067, and thus, the display video selected in the second selection reception step S068 corresponds to the display video selected in the second display step S067.

In a case where the user presses the release button 25 after the execution of the second selection reception step S068, the storage step S069 is executed. In the storage step S069, the second-B video data corresponding to the display video selected in the second display step S067 is stored in the internal memory 50, the memory card 52, or the like. That is, the video data stored in the storage step S069 is the second video data that is created by executing the first correction and the second correction on the first video data with the correction amount selected by the user.

As described above, in the third display mode, first, the first correction with different correction amounts is executed on the first video data to create a plurality of pieces of second-A video data. Then, the display videos corresponding to the respective pieces of second-A video data are displayed on the display 31, and the user is made to select one of the display videos. Thereafter, the first correction and the second correction are executed on the first video data to create a plurality of pieces of second-B video data. Then, the display videos corresponding to the respective pieces of second-B video data are displayed on the display 31, and the user is made to select one of the display videos. The display videos are displayed on the display 31 in a stepwise manner while changing the type of the correction, whereby the number of videos displayed on the screen of the display 31 at one time is reduced, and the visibility of the display video is improved. The display videos are displayed in a stepwise manner while changing the type of the correction, whereby the user can select the display video in a stepwise manner for each type of correction, and thus, user's convenience is improved.

In the third display mode, in a case where the release button 25 is pressed after the execution of the second selection reception step S068, in the storage step S069, the second-B video data corresponding to the display video selected during the execution of the second display step S067 is stored.

On the other hand, for example, in a case where the release button 25 is pressed in a period from after the execution of the first selection reception step S065 until before the execution of the second selection reception step S068, the storage step may be executed at that time. In the storage step of this case, for example, the second-A video data corresponding to the display video selected in the first selection reception step S065 is preferably stored.

A fourth display mode is, for example, a mode in which different portions in the respective nine display videos are displayed on the display 31 on a magnified scale as shown in FIG. 23. The different portions are portions in the display videos where the gradation value is different among the nine pieces of second video data, and simply, correspond to, for example, the first gradation portion on which the first gradation correction is executed and the second gradation portion on which the second gradation correction is executed.

In the fourth display mode, the visibility of portions (that is, the different portions) in the display videos where the gradation value is different between the second video data is improved. As a result, the user can appropriately recognize the effect of the correction on the gradation value of the different portion by viewing the different portions displayed on a magnified scale.

In a case where the different portion displayed on a magnified scale in the display video is a portion designated by the user, it is preferable since user's convenience is improved. The designation of the different portion by the user is preferably performed through the select button 26, the touch panel 27, or the like during or before the execution of the display step S053. The user may designate a plurality of different portions in one display video, and in this case, each of a plurality of designated different portions may be displayed on the display 31.

Although the four display modes have been described above, display modes other than the above-described modes may be further included. In the video display flow in the second embodiment, any of the four display modes described above or two or more modes may be used in combination. In a case where the two or more display modes are combined, preferably, the display modes to be used can be suitably changed. For example, in a case where the first display mode and the second display mode described above are used in combination, the user may perform a predetermined mode switching operation while the display videos are displayed on the display 31 in the first display mode, such that the display mode may be switched to the second display mode. That is, the state of the display 31 may transit from a state in which the nine display videos are arranged and displayed in a matrix to a state in which the two display videos are displayed.

Other Embodiment

The embodiments described above are specific examples exemplified for ease of understanding of the display method and the display apparatus of the invention and are merely examples, and other embodiments are also considered.

In the above-described embodiments, although a digital camera with an EVF is exemplified as an example of the imaging apparatus configuring the display apparatus of the invention, the display apparatus of the invention may be other imaging apparatuses with an EVF (for example, a video camera and a smartphone).

In the embodiments described above, the processor 40 in an imaging apparatus body (a portion other than the finder 30 in the imaging apparatus 10) performs the execution of the correction, and in detail, the creation of the video data and the display data indicating the corrected output value. However, the invention is not limited thereto, and for example, a circuit for correction (corresponding to an example of a processor) provided in the finder 30 may be provided separately from the processor 40 of the imaging apparatus body. In this case, the circuit for correction may create the video data and the display data indicating the corrected output value, and may display the video corresponding to the created data on the display 31.

In the embodiments described above, the storage device that stores the video data is provided in the imaging apparatus 10. However, the invention is not limited thereto, and for example, an external terminal, a server computer, or the like connected to the imaging apparatus 10 in a communicable manner may be used as a storage device, and video data may be stored in the storage device.

EXPLANATION OF REFERENCES

10: imaging apparatus
12: imaging lens
14: connection portion
16: stop

18: shutter
20: imaging element
22: rear display
24: operating unit
25: release button
26: select button
27: touch panel
30: finder
31: display
32: observation optical system
33: eyepiece frame
34: sensor
40: processor
42: control processing unit
44: video creation unit
45: A/D conversion circuit
46: video data acquisition circuit
47: display data creation circuit
48: first video data acquisition circuit
49: second video data creation circuit
50: internal memory
52: memory card

What is claimed is:

1. A display method using a display apparatus including a sensor configured to detect intensity of ambient light and a finder provided with a display inside, the display method comprising:
    an acquisition step of acquiring video data by imaging under the ambient light;
    a creation step of creating display data based on the video data; and
    a display step of displaying a display video corresponding to the display data on the display,
    wherein, in a case where the intensity of the ambient light is equal to or greater than a first threshold value, the creation step or the display step is executed under a first condition that lightness of the display video displayed on the display is brighter than lightness of a first standard video,
    in a case where the intensity of the ambient light is equal to or less than a second threshold value, the creation step or the display step is executed under a second condition that the lightness of the display video displayed on the display is darker than lightness of a second standard video,
    wherein, before a usage time for which a user uses the finder reaches a set time, the creation step or the display step is executed under the first condition or the second condition, and
    wherein, after the usage time reaches, the creation step and the display step are executed without the first condition and the second condition.

2. The display method according to claim 1,
    wherein, in a case where the intensity of the ambient light is equal to or less than the second threshold value, the creation step is executed under the second condition, and
    the second standard video is a video that is displayed on the display corresponding to display data created based on video data acquired by imaging under the ambient light with intensity exceeding the second threshold value.

3. The display method according to claim 1,
    wherein the display video is displayed on the display in a case where a distance between a user and the display apparatus is equal to or less than a predetermined distance.

4. The display method according to claim 1,
    wherein the display data indicates an output value with respect to an input gradation value indicated by the video data,
    the input gradation value is defined within a numerical value range including a first gradation value, a second gradation value, and a median value between the first gradation value and the second gradation value,
    in the creation step, first display data and second display data that are different in the output value with respect to the input gradation value closer to the first gradation value or the second gradation value than the median value are created as the display data, and
    in the display step, a display video corresponding to data selected based on the intensity of the ambient light between the first display data and the second display data is displayed on the display.

5. The display method according to claim 1,
    wherein, in the creation step, correction corresponding to the intensity of the ambient light is executed on an output value with respect to an input gradation value indicated by the video data to create the display data indicating a corrected output value, and
    a correction amount to the output value in the creation step is changed depending on a distance between a user and the finder or lightness in the finder.

6. The display method according to claim 1,
    wherein, in the creation step, correction corresponding to the intensity of the ambient light is executed on an output value with respect to an input gradation value indicated by the video data to create the display data indicating a corrected output value, and uncorrected display data indicating the output value on which the correction is not executed is created, and
    in the display step, the display video corresponding to the display data indicating the corrected output value and the display video corresponding to the uncorrected display data are displayed on the display together.

7. The display method according to claim 1,
    wherein the video data indicates an input gradation value of each portion of an angle of view at the time of imaging,
    in a case where the intensity of the ambient light is equal to or greater than the first threshold value, the creation step is executed under the first condition,
    in a case where a first gradation portion in the angle of view where the input gradation value is equal to or less than a first reference value has a predetermined width or more, in the creation step, first gradation correction for increasing an output value with respect to the input gradation value of the first gradation portion is executed to create the display data, and
    a correction amount in the first gradation correction is greater as a difference between the input gradation value of the first gradation portion and the first reference value is greater.

8. The display method according to claim 1,
    wherein the video data indicates an input gradation value of each portion of an angle of view at the time of imaging,
    in a case where the intensity of the ambient light is equal to or less than the second threshold value, the creation step is executed under the second condition,
    in a case where a second gradation portion in the angle of view where the input gradation value is equal to or greater than a second reference value has a predetermined width or more, in the creation step, second gradation correction for decreasing an output value with respect to the input gradation value of the second gradation portion is executed to create the display data, and a correction amount in the second gradation correction is greater as a difference between the input gradation value of the second gradation portion and the second reference value is greater.

9. The display method according to claim 1,
wherein, in a case where the intensity of the ambient light is equal to or greater than the first threshold value, the creation step is executed under the first condition, and
the first standard video is a video that is displayed on the display corresponding to display data created based on video data acquired by imaging under the ambient light with intensity less than the first threshold value.

10. The display method according to claim 9,
wherein, in a case where the intensity of the ambient light is equal to or less than the second threshold value, the creation step is executed under the second condition, and
the second standard video is a video that is displayed on the display corresponding to display data created based on video data acquired by imaging under the ambient light with intensity exceeding the second threshold value.

11. A display apparatus comprising:
a processor;
a sensor configured to detect intensity of ambient light; and
a finder provided with a display inside,
wherein the processor is configured to acquire video data by imaging under the ambient light, create display data based on the video data, and display a display video corresponding to the display data on the display,
the processor is configured to create the display data or display the display video under a first condition that lightness of the display video displayed on the display is brighter than lightness of a first standard video in a case where the intensity of the ambient light is equal to or greater than a first threshold value or
the processor is configured to create the display data or to display the display video under a second condition that the lightness of the display video displayed on the display is darker than lightness of a second standard video in a case where the intensity of the ambient light is equal to or less than a second threshold value,
wherein, before a usage time for which a user uses the finder reaches a set time, the processor is configured to create the display data or to display the display video under the first condition or the second condition, and
wherein, after the usage time reaches, the processor is configured to create the display data and to display the display video without the first condition and the second condition.

12. A display method using a display apparatus including a finder provided with a display inside, the display method comprising:
an acquisition step of acquiring first video data by imaging;
a creation step of creating a plurality of pieces of second video data indicating different gradation values based on the first video data;
a display step of displaying a plurality of display videos corresponding to the plurality of pieces of second video data on the display;

a reminder step of reminding a user of usage of the finder in a case of displaying the plurality of display videos on the display; and
a storage step of storing the second video data corresponding to a display video selected by the user from among the plurality of display videos, in a storage device.

13. The display method according to claim 12,
wherein, in the acquisition step, a plurality of pieces of the first video data with different exposure conditions are acquired, and
in the display step, a plurality of the display videos based on the plurality of pieces of first video data with different exposure conditions are displayed on the display together.

14. The display method according to claim 12,
wherein, in a case where a distance between the user and the display apparatus is equal to or less than a predetermined distance, the display video is displayed on the display.

15. The display method according to claim 12,
wherein the plurality of pieces of second video data include second video data in which correction is executed on a gradation value indicated by the first video data,
in the creation step, the second video data in which first gradation correction is executed on a gradation value equal to or less than a first reference value in the first video data and the second video data in which second gradation correction is executed on a gradation value equal to or greater than a second reference value in the first video data are created, and
in the display step, a display video corresponding to the second video data on which the first gradation correction is executed and a display video corresponding to the second video data on which the second gradation correction is executed are displayed in parallel on the display.

16. The display method according to claim 15,
wherein, in a case where one of the first gradation correction and the second gradation correction is first correction, and the other gradation correction is second correction,
the creation step includes a first creation step and a second creation step,
the display step includes a first display step and a second display step,
in the first creation step, two or more pieces of second-A video data on which a plurality of the first corrections with different correction amounts are executed are created,
in the first display step, two or more display videos corresponding to the two or more pieces of second-A video data are displayed on the display,
in the second creation step, two or more pieces of second-B video data on which the first correction executed in creating the second-A video data corresponding to the display video selected in the first display step and a plurality of the second corrections with different correction amounts are executed are created,
in the second display step, two or more display videos corresponding to the two or more pieces of second-B video data are displayed on the display, and
in the storage step, the second-B video data corresponding to the display video selected in the second display step is stored in the storage device.

17. The display method according to claim 12,
wherein, in the display step, different portions where a gradation value is different between the plurality of pieces of second video data in the display videos are displayed on the display on a magnified scale.

18. The display method according to claim 17,
wherein, in the display step, the different portions designated by the user are displayed on the display on a magnified scale.

19. A display apparatus comprising:
a processor; and
a finder provided with a display inside,
wherein the processor is configured to acquire first video data by imaging, create a plurality of pieces of second video data indicating different gradation values based on the first video data, and display a plurality of display videos corresponding to the plurality of pieces of second video data on the display, and
the processor is configured to remind a user of usage of the finder in a case of displaying the plurality of display videos on the display, and store the second video data corresponding to a display video selected by the user from among the plurality of display videos, in a storage device.

20. A display method using a display apparatus including a sensor configured to detect intensity of ambient light and a finder provided with a display inside, the display method comprising:

an acquisition step of acquiring video data by imaging under the ambient light;
a creation step of creating display data based on the video data; and
a display step of displaying a display video corresponding to the display data on the display,
wherein, in a case where the intensity of the ambient light is equal to or greater than a first threshold value, the creation step or the display step is executed under a condition that lightness of the display video displayed on the display is brighter than lightness of a first standard video,
in a case where the intensity of the ambient light is equal to or less than a second threshold value, the creation step or the display step is executed under a condition that the lightness of the display video displayed on the display is darker than lightness of a second standard video,
wherein, in the creation step, correction corresponding to the intensity of the ambient light is executed on an output value with respect to an input gradation value indicated by the video data to create the display data indicating a corrected output value, and
wherein a correction amount to the output value in the creation step is changed depending on a distance between a user and the finder or lightness in the finder.

* * * * *